(12) United States Patent
Penot

(10) Patent No.: US 6,951,897 B2
(45) Date of Patent: Oct. 4, 2005

(54) RUBBER COMPOSITION FOR A TIRE COMPRISING A REINFORCING INORGANIC FILLER AND AN (INORGANIC FILLER/ELASTOMER) COUPLING SYSTEM

(75) Inventor: Christophe Penot, Saint Pierre des Corps (FR)

(73) Assignee: Michelin Recherche et Technique S.A., Granges-Paccot (CH)

(*) Notice: Subject to any disclaimer, the term of this patent is extended or adjusted under 35 U.S.C. 154(b) by 587 days.

(21) Appl. No.: 10/201,482

(22) Filed: Jul. 23, 2002

(65) Prior Publication Data

US 2003/0105242 A1 Jun. 5, 2003

Related U.S. Application Data

(63) Continuation of application No. PCT/EP01/00662, filed on Jan. 22, 2001.

(30) Foreign Application Priority Data

Jan. 24, 2000 (FR) .............................. 00 01012

(51) Int. Cl.$^7$ .............................................. C08L 5/29
(52) U.S. Cl. ....................... 524/237; 524/211; 524/216; 524/261; 524/492; 525/331.9; 525/332.6; 152/209.1
(58) Field of Search .......................... 525/331.9, 332.6; 524/492, 261, 211, 216, 237

(56) References Cited

U.S. PATENT DOCUMENTS

| 3,842,111 | A | 10/1974 | Meyer-Simon et al. ............. 260/448.2 E |
|---|---|---|---|
| 3,873,489 | A | 3/1975 | Thurn et al. ......... 260/448.2 N |
| 3,978,103 | A | 8/1976 | Meyer-Simon et al. ................... 260/448.8 R |
| 3,997,581 | A | 12/1976 | Pletka et al. .......... 260/448.8 R |
| 4,002,594 | A | 1/1977 | Fetterman ................. 260/42.37 |
| 4,072,701 | A | 2/1978 | Pletka et al. .......... 260/448.8 R |
| 4,129,585 | A | 12/1978 | Buder et al. .......... 260/448.8 R |
| 4,450,030 | A | 5/1984 | Melody et al. .......... 156/307.3 |
| 4,835,209 | A | * 5/1989 | Kitagawa et al. ............ 524/507 |
| 5,109,907 | A | * 5/1992 | Stayer et al. ................ 152/564 |
| 5,268,413 | A | * 12/1993 | Antkowiak et al. .......... 524/526 |
| 5,310,798 | A | * 5/1994 | Lawson et al. .............. 525/102 |
| 5,569,721 | A | 10/1996 | Scholl et al. ............. 525/332.7 |
| 5,580,919 | A | 12/1996 | Agostini et al. .............. 524/430 |
| 5,583,245 | A | 12/1996 | Parker et al. ................ 556/427 |
| 5,650,457 | A | 7/1997 | Scholl et al. ............... 524/262 |
| 5,652,310 | A | 7/1997 | Hsu et al. ................. 525/331.9 |
| 5,663,358 | A | 9/1997 | Cohen et al. ................ 548/166 |
| 5,663,395 | A | 9/1997 | Göbel et al. ................ 556/427 |
| 5,663,396 | A | 9/1997 | Musleve et al. ............. 556/427 |
| 5,674,932 | A | 10/1997 | Agostini et al. ............. 524/430 |
| 5,675,014 | A | 10/1997 | Cohen et al. ................ 548/110 |
| 5,684,171 | A | 11/1997 | Wideman et al. ............ 556/427 |
| 5,684,172 | A | 11/1997 | Wideman et al. ............ 556/427 |
| 5,696,197 | A | 12/1997 | Smith et al. ................. 524/495 |
| 5,698,646 | A | * 12/1997 | Kitamura et al. ............ 526/174 |
| 5,708,053 | A | 1/1998 | Jalics et al. ................. 523/200 |
| 5,747,601 | A | 5/1998 | Broussard et al. ........... 525/375 |
| 5,892,085 | A | 4/1999 | Munzenberg et al. ........ 552/427 |
| 6,420,488 | B1 | 7/2002 | Penot ....................... 525/332.7 |

FOREIGN PATENT DOCUMENTS

| DE | 4435311 | 4/1996 | |
|---|---|---|---|
| EP | 0334377 | 9/1989 | |
| EP | 0501227 | 9/1992 | |
| EP | 0502733 | 9/1992 | |
| EP | 0683203 | 11/1995 | |
| EP | 0735088 | 10/1996 | |
| EP | 0784072 | 7/1997 | |
| EP | 0794219 | 9/1997 | |
| EP | 0810258 | 12/1997 | |
| EP | 0867491 | 9/1998 | |
| EP | 1043357 | 10/2000 | |
| FR | 2094859 | 2/1972 | |
| FR | 2206330 | 7/1974 | |
| FR | 2765881 | 1/1999 | |
| FR | 2765881 A1 * | 1/1999 | ............. C08L/9/00 |
| WO | 9610604 | 4/1996 | |
| WO | 9928376 | 6/1999 | |

OTHER PUBLICATIONS

Hofmann, W., ed., *Vulcanization and Vulcanizing Agents*, pp. 180–182, London: MacLaren & Sons, Ltd. (1967).

Brunauer et al., *Journal of the American Chemical Society*, 60:309–319 (Feb. 1938).

March, J., ed., *Advanced Organic Chemistry—Reactions, Mechanisms and Structure*, 4th Ed., p. 896 (John Wiley & Sons 1992).

* cited by examiner

Primary Examiner—David W. Wu
Assistant Examiner—Rip A. Lee
(74) *Attorney, Agent, or Firm*—Fitzpatrick, Cella, Harper & Scinto

(57) ABSTRACT

The present invention is directed to a rubber composition that is useful for the manufacture of tires, where the composition is based on a diene elastomer, a reinforcing inorganic filler, and a coupling system. The coupling system comprises a polysulfurized alkoxysilane ("PSAS") coupling agent (inorganic filler/diene elastomer) associated with an aldimine having the general formula R—CH=N—R and a guanidine derivative. The present invention is further directed to tires and semi-finished products for tires comprising a rubber composition according to the invention. The invention is also directed to a coupling system (inorganic filler/diene elastomer) for a rubber composition based on a diene elastomer reinforced by an inorganic filler, where the coupling system comprises a polysulfurized alkoxysilane (PSAS) coupling agent in association with an aldimine having the general formula R—CH=N—R and a guanidine derivative.

70 Claims, 6 Drawing Sheets

RUBBER COMPOSITION FOR A TIRE COMPRISING A REINFORCING INORGANIC FILLER AND AN (INORGANIC FILLER/ELASTOMER) COUPLING SYSTEM

CROSS-REFERENCE TO RELATED APPLICATIONS

This application is a continuation of International Application No. PCT/EP01/00662, published in French on Aug. 2, 2001 as International Publication No. WO 01/55253 and filed on Jan. 22, 2001, which claims priority to French Patent Application No. 00/01012, filed on Jan. 24, 2000.

FIELD OF THE INVENTION

The present invention relates to diene rubber compositions reinforced with an inorganic filler, which are intended in particular for the manufacture of tires or semi-finished products for tires, in particular treads for these tires.

BACKGROUND OF THE INVENTION

Since fuel economies and the need to protect the environment have become priorities, it has become desirable to produce elastomers with good mechanical properties and as low a hysteresis as possible so that they can be used in the form of rubber compositions usable for the manufacture of various semi-finished products involved in the constitution of tires, such as, for example, underlayers, calendering or sidewall rubbers, or treads, and to obtain tires with improved properties, having in particular reduced rolling resistance.

To achieve such an objective, numerous solutions have been proposed, first of all ones essentially concentrating on the use of elastomers modified by means of agents such as coupling, starring or functionalizing agents, with carbon black as the reinforcing filler, with the aim of obtaining a good interaction between the modified elastomer and the carbon black. It is generally known that in order to obtain the optimum reinforcement properties imparted by a filler, the latter should be present in the elastomeric matrix in a final form which is both as finely divided as possible and distributed as homogeneously as possible. Now, such conditions may only be obtained insofar as the filler has a very good ability firstly to be incorporated into the matrix during mixing with the elastomer and to disagglomerate, and secondly to be dispersed homogeneously in this matrix.

It is known that carbon black has such abilities, which is generally not true of white or inorganic fillers. For reasons of mutual attraction, the inorganic filler particles have a tendency to agglomerate together within the elastomeric matrix. These interactions have the harmful consequence of limiting the dispersibility of the filler and hence the reinforcing properties to a substantially lower level than that which it would be theoretically possible to achieve if all the (inorganic filler/elastomer) bonds that could be created during the mixing operation were in fact obtained. These interactions also tend to increase the consistency of the rubber compositions and therefore to make them more difficult to work ("processability") in the uncured state than in the presence of carbon black.

However, interest in rubber compositions reinforced with inorganic filler was greatly revived with the publication of European Patent Application EP 0 501 227, which discloses a sulfur-vulcanizable diene rubber composition, reinforced with a special precipitated silica of the highly dispersible type, which makes it possible to manufacture a tire or tread with substantially improved rolling resistance, without adversely affecting the other properties, in particular those of grip, endurance and wear resistance. Patent Applications EP 0 810 258 and WO99/28376 disclose diene rubber compositions reinforced with other special inorganic fillers, specifically aluminas or aluminum (oxide-)hydroxides, of high dispersibility, which also make it possible to obtain tires or treads having such an excellent compromise of contradictory properties.

Although the use of these specific, highly reinforcing, siliceous or aluminous inorganic fillers has reduced the difficulties of processing the rubber compositions that contain them, such rubber compositions are nevertheless more difficult to process than rubber compositions filled conventionally with carbon black.

In particular, it is necessary to use a coupling agent, also known as a bonding agent, the function of which is to provide the connection between the surface of the inorganic filler particles and the elastomer, while facilitating the dispersion of this inorganic filler within the elastomeric matrix.

The term "coupling agent" (inorganic filler/elastomer) is understood to mean an agent capable of establishing a sufficient chemical and/or physical connection between the inorganic filler and the elastomer. Such a coupling agent, which is at least bifunctional, has, for example, the simplified general formula "Y-T-X", in which:

Y represents a functional group ("Y function") which is capable of bonding physically and/or chemically with the inorganic filler, where the bond is able to be established, for example, between a silicon atom of the coupling agent and the hydroxyl (OH) surface groups of the inorganic filler (for example, surface silanols in the case of silica);

X represents a functional group ("X function") which is capable of bonding physically and/or chemically with the elastomer, for example by means of a sulfur atom; and T represents a hydrocarbon group making it possible to link Y and X.

The coupling agents must not be confused with simple agents for covering the inorganic filler which, as is known, may comprise the Y function which is active with respect to the inorganic filler but are devoid of the X function which is active with respect to the elastomer.

Silica/elastomer coupling agents in particular have been described in a large number of documents, the best known being bifunctional alkoxysilanes. For example, in French patent application FR 2 094 859, it was proposed to use a mercaptosilane for the manufacture of tire treads. It was quickly shown, and is today well known, that the mercaptosilanes, and in particular γ-mercaptopropyltrimethoxysilane or γ-mercaptopropyltriethoxysilane, are capable of giving excellent silica/elastomer coupling properties, but that these coupling agents cannot be used industrially because of the high reactivity of the —SH functions. Specifically, this high reactivity rapidly results in premature vulcanization or "scorching" during the preparation of the rubber composition in an internal mixer, in very high Mooney plasticity values, and in rubber compositions which are virtually impossible to work and process industrially. To illustrate this impossibility of using such coupling agents bearing —SH functions and the rubber compositions that contain them industrially, documents FR 2 206 330 and U.S. Pat. No. 4,002,594 may be cited, for example.

To overcome this drawback, it has been proposed to replace these mercaptosilanes by polysulfurized alkoxysilanes, in particular bis-($C_1$–$C_4$)alkoxysilylpropyl polysulfides such as described in numerous patents or patent applications. (See, for example, FR 2 206 330 or U.S. Pat. Nos. 3,842,111; 3,873,489; 3,978,103; and 3,997,581.) These polysulfurized alkoxysilanes are generally considered to be the products which, for vulcanized rubber compositions filled with silica, give the best compromise in terms of resistance to scorching, processability and reinforcing power. These polysulfides include, for example, bis-3-triethoxysilylpropyl disulfide (abbreviated to TESPD), more particularly bis-3-triethoxysilylpropyl tetrasulfide (abbreviated to TESPT), which is known as an (inorganic filler/diene elastomer) coupling agent which is effective (and frequently used) in rubber compositions for tires, in particular those intended to form treads. TESPT is sold, for example, by Degussa under the name "Si69".

SUMMARY OF THE INVENTION

It has been discovered that the use of an aldimine in a small quantity, in combination with a guanidine derivative, has the unexpected effect of activating the coupling function of the polysulfurized alkoxysilanes, and thereby increasing the effectiveness of the polysulfurized alkoxysilanes.

Due to this activation, it is possible to substantially reduce the quantity of polysulfurized alkoxysilanes which is usually used. This is particularly advantageous because these alkoxysilanes are very expensive and must be used in a large quantity, of the order of two to three times more than the quantity of γ-mercaptopropyltrialkoxysilanes necessary to obtain levels of equivalent coupling properties. These well-known disadvantages have been described, for example, in U.S. Pat. Nos. 5,652,310; 5,684,171; and 5,684,172. Thus, the overall cost of the rubber compositions can be significantly reduced, as can that of the tires containing them.

Consequently, a first object of the present invention relates to a rubber composition which can be used for the manufacture of tires, where the rubber composition is based on a diene elastomer, a reinforcing inorganic filler, and a coupling system. The coupling system comprises a polysulfurized alkoxysilane coupling agent (inorganic filler/diene elastomer) associated with an aldimine and a guanidine derivative.

Another object of the present invention is the use of a rubber composition of the invention for the manufacture of rubber articles, in particular, tires or semi-finished products intended for such tires. These semi-finished products for tires may include treads, underlayers intended, for example, to be positioned beneath these treads, crown plies, sidewalls, carcass plies, beads, protectors, inner tubes and airtight internal rubbers for tubeless tires.

The present invention relates more particularly to the use of such a rubber composition for the manufacture of the sidewalls or treads, because of the good hysteresis properties of the rubber composition.

The invention also relates to a process for the preparation of a composition of the invention, where the process includes incorporating, by kneading into a diene elastomer, a reinforcing inorganic filler, and a coupling system, where the coupling system comprises a polysulfurized alkoxysilane coupling agent (inorganic filler/diene elastomer) associated with an aldimine and a guanidine derivative. The entire mixture is kneaded thermomechanically, in one or more steps, until a maximum temperature of between 120° C. and 190° C. is reached.

The composition of the invention is particularly suitable for the manufacture of treads for tires intended to be fitted on passenger vehicles, 4×4 vehicles, vans, two-wheelers and truck vehicles, aircraft, or construction, agricultural or handling machinery. Also, these treads are useful in the manufacture of new tires or for recapping worn tires.

The present invention further provides for tires and semi-finished rubber products, where the tires and semi-finished rubber products comprise a rubber composition of the present invention.

The present invention relates in particular to treads for tires. Because of the rubber compositions of the present invention, these treads have both low rolling resistance and high wear resistance.

The invention also relates to a coupling system (inorganic filler/diene elastomer) for a diene rubber composition based on a diene elastomer reinforced by an inorganic filler, useful for the manufacture of tires, where the coupling system comprises a polysulfurized alkoxysilane coupling agent in association with an aldimine and a guanidine derivative.

A further object of the present invention is the use of such a coupling system (inorganic filler/diene elastomer) in a rubber composition for a tire.

The present invention further discloses the use, in combination, of an aldimine and a guanidine derivative, in a rubber composition reinforced by an inorganic filler, for activating the coupling function (inorganic filler/diene elastomer) of the polysulfurized alkoxysilanes.

Still another object of the present invention is a process for coupling an inorganic filler and a diene elastomer, in a rubber composition, where the process includes incorporating a diene elastomer, a reinforcing inorganic filler, a polysulfurized alkoxysilane, an aldimine, and a guanidine derivative, where the entire mixture is kneaded thermomechanically, in one or more stages, until a maximum temperature of between 120° C. and 190° C. is reached.

BRIEF DESCRIPTION OF THE DRAWINGS

The invention and its advantages will be readily understood in the light of the description and example embodiments which follow, and of the accompanying drawings, wherein.

DETAILED DESCRIPTION OF THE INVENTION

Figure 1:
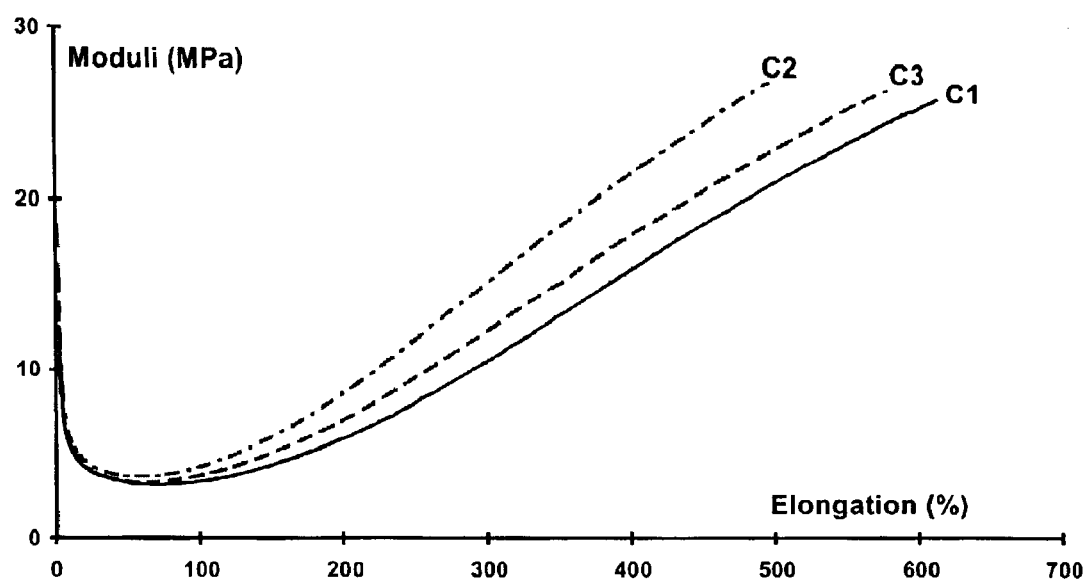
FIG. 1 shows curves of the variation of modulus (in MPa) as a function of elongation (in %) for rubber compositions C1, C2, and C3.

The present invention is further described below with respect to certain specific embodiments.

The measurements made and tests used to characterize the rubber compositions of the present invention are described below. The rubber compositions are characterized before and after curing, as indicated below.

Mooney Plasticity Test: An oscillating consistometer such as described in standard AFNOR-NFT-43005 (November 1980) is used. The Mooney plasticity is measured in accordance with the following principle: the composition in the raw state (i.e., before curing) is molded in a cylindrical enclosure heated to 100° C. After one minute of preheating, the rotor turns within the test sample at 2 rpm, and the torque used for maintaining this movement is measured after 4 minutes of rotation. The Mooney plasticity (ML 1+4) is expressed in "Mooney units" (MU, where 1 MU=0.83 Newton meters).

Scorching Time Test: The measurements are effected at 130° C., in accordance with standard AFNOR-NFT-43004 (November 1980). The evolution of the consistometric index as a function of time makes it possible to determine the scorching time for the rubber compositions, assessed in accordance with the above standard by the parameter T5, which is expressed in minutes and is defined as the time necessary to obtain an increase in the consistometric index (expressed in MU) of 5 units above the minimum value measured for this index.

Tensile Tests: These tensile tests make it possible to determine the elasticity stresses and the properties at break. Unless indicated otherwise, these tests are effected in accordance with standard AFNOR-NFT-46002 of September 1988. The nominal secant moduli (in MPa) at 10% elongation (M10), 100% elongation (M100) and 300% elongation (M300) are measured in a second elongation (i.e., after an accommodation cycle). The breaking stresses (in MPa) and the elongations at break (in %) are also measured. All of these tensile measurements are effected under normal conditions of temperature and humidity in accordance with standard AFNOR-NFT-40101 (December 1979).

Processing the tensile data recorded also makes it possible to trace the curve of the modulus as a function of the elongation as shown in FIGS. 1–6, described in more detail below. The modulus used here is the true secant modulus measured in a first elongation, calculated with respect to the real cross-section of the test piece, and not to the initial section as previously for the nominal moduli.

Hysteresis Loss Test: The hysteresis losses (HL) are measured by rebound at 60° C. at the sixth impact, and are expressed in % in accordance with the following equation (where $W_0$=energy supplied; and $W_1$=energy restored):

$$HL(\%)=100[(W_0-W_1)/W_0]$$

The rubber compositions according to the present invention are based on the following constituents: (i) at least one diene elastomer (component A), (ii) at least one inorganic filler as the reinforcing filler (component B), (iii) at least one polysulfurized alkoxysilane, referred to herein as "PSAS" (component C) as the coupling agent (inorganic filler/diene elastomer), with which there are associated, in order to activate the coupling, (iv) at least one aldimine (component D) and (v) at least one guanidine derivative (component E).

The expression "composition based on" is to be understood to mean a composition comprising the mix and/or the product of reaction in situ of the various constituents used, some of these constituents being liable to, or intended to, react together, at least in part, during the different phases of manufacture of the composition, in particular during the vulcanization thereof.

The coupling system according to the invention comprises a PSAS coupling agent, where the PSAS coupling agent preferably makes up more than 50% by weight of the coupling system, and of a coupling activator formed by the association of an aldimine and a guanidine derivative.

As is known, the term "diene" elastomer or rubber is understood to mean an elastomer resulting, at least in part (i.e., a homopolymer or a copolymer) from diene monomers (monomers bearing two double carbon-carbon bonds, whether conjugated or not).

In general, "essentially unsaturated" diene elastomer is understood here to mean a diene elastomer resulting at least in part from conjugated diene monomers, having a content of members or units of diene origin (conjugated dienes) which is greater than 15% (mol %).

Thus, for example, diene elastomers such as butyl rubbers or copolymers of dienes and of alpha-olefins of the EPDM type do not fall within the preceding definition, and may, in particular, be described as "essentially saturated" diene elastomers (having a low content of units of diene origin which is less than 15%).

Within the category of "essentially unsaturated" diene elastomers, "highly unsaturated" diene elastomer is understood to mean, in particular, a diene elastomer having a content of units of diene origin (conjugated dienes) which is greater than 50%.

These definitions being given, the following are understood to be a diene elastomer capable of being used in the compositions according to the present invention:

(a)—any homopolymer obtained by polymerization of a conjugated diene monomer having 4 to 12 carbon atoms;

(b)—any copolymer obtained by copolymerization of one or more dienes conjugated together or with one or more vinyl aromatic compounds having 8 to 20 carbon atoms;

(c)—a ternary copolymer obtained by copolymerization of ethylene, of an a-olefin having 3 to 6 carbon atoms with a non-conjugated diene monomer having 6 to 12 carbon atoms, such as, for example, the elastomers obtained from ethylene and from propylene with a non-conjugated diene monomer of the aforementioned type, such as, in particular, 1,4-hexadiene, ethylidene norbornene or dicyclopentadiene; and (d)—a copolymer of isobutene and isoprene (butyl rubber), and the halogenated, in particular chlorinated or brominated, versions of this type of copolymer.

Although the present invention applies to any type of diene elastomer, the person skilled in the art of tires will understand that the present invention, in particular when the rubber composition is intended for a tire tread, is used first and foremost with essentially unsaturated diene elastomers, in particular those of type (a) or (b) above.

Suitable conjugated dienes are, in particular, 1,3-butadiene, 2-methyl-1,3-butadiene, 2,3-di($C_1$–$C_5$ alkyl)-1,3-butadienes such as, for instance, 2,3-dimethyl-1,3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3-pentadiene and 2,4-hexadiene. Suitable vinyl aromatic compounds are, for example, styrene, ortho-, meta- and para-methylstyrene, the commercial mixture "vinyltoluene", para-tert.-butylstyrene, methoxystyrenes, chlorostyrenes, vinylmesitylene, divinylbenzene and vinylnaphthalene.

The copolymers may contain between 99% and 20% by weight of diene units and between 1% and 80% by weight of vinyl aromatic units. The elastomers may have any microstructure, which is a function of the polymerization conditions used, in particular of the presence or absence of a modifying and/or randomizing agent and the quantities of modifying and/or randomizing agent used. The elastomers may, for example, be block, statistical, sequential or microsequential elastomers, and may be prepared in dispersion or in solution; they may be coupled and/or starred or alternatively functionalized with a coupling and/or starring or functionalizing agent.

Polybutadienes are preferably suitable, and in particular those having a content of 1,2-units of between 4% and 80%, or those having a cis-1,4 content of more than 80%, polyisoprenes, butadiene-styrene copolymers, and in particular those having a styrene content of between 5% and 50% by weight and, more particularly, between 20% and 40%, a content of 1,2-bonds of the butadiene part of between 4% and 65%, and a content of trans-1,4 bonds of between 20% and 80%, butadiene-isoprene copolymers, and, in particular, those having an isoprene content of between 5% and 90% by weight and a glass transition temperature ($T_g$) of −40° C. to −80° C., isoprene-styrene copolymers and in particular those having a styrene content of between 5% and 50% by weight and a $T_g$ of between −25° C. and −50° C. In the case of butadiene-styrene-isoprene copolymers, those which are suitable are in particular those having a styrene content of between 5% and 50% by weight and, more particularly, between 10% and 40%, an isoprene content of between 15% and 60% by weight, and more particularly between 20% and 50%, a butadiene content of between 5% and 50% by weight, and more particularly between 20% and 40%, a content of 1,2-units of the butadiene part of between 4% and 85%, a content of trans-1,4 units of the butadiene part of between 6% and 80%, a content of 1,2- plus 3,4-units of the isoprene part of between 5% and 70%, and a content of trans-1,4 units of the isoprene part of between 10% and 50%, and more generally any butadiene-styrene-isoprene copolymer having a Tg of between −20° C. and −70° C.

In summary, in preferred embodiments, the diene elastomer of the composition according to the invention is selected from the group of highly unsaturated diene elastomers which consists of polybutadienes (BR), polyisoprenes (IR), natural rubber (NR), butadiene copolymers, isoprene copolymers and mixtures of these elastomers. Such copolymers are more preferably selected from the group which consists of butadiene-styrene copolymers (SBR), butadiene-isoprene copolymers (BIR), isoprene-styrene copolymers (SIR) and isoprene-butadiene-styrene copolymers (SBIR).

The composition according to the invention is particularly intended for a tread for a tire, where the tread is for a new or a used tire (recapping).

In the case of a passenger-car tire, component A is, for example, an SBR or an SBR/BR, SBR/NR (or SBR/IR), or alternatively BR/NR (or BR/IR) blend or mixture. In the case of an SBR elastomer, in particular, an SBR having a styrene content of between 20% and 30% by weight, a content of vinyl bonds of the butadiene part of between 15% and 65%, a content of trans-1,4 bonds of between 15% and 75%, and a $T_g$ of between −20° C. and −55° C. is used. Such an SBR copolymer, preferably prepared in solution, is possibly used in a mixture with a polybutadiene (BR) having preferably more than 90% cis-1,4 bonds.

In the case of a tire for a utility vehicle, in particular, for a truck vehicle—i.e., subway, bus, road transport machinery (lorries, tractors, trailers), off-road vehicles—component A is selected, for example, from the group consisting of natural rubber, synthetic polyisoprenes, isoprene copolymers (isoprene-butadiene, isoprene-styrene, butadiene-styrene-isoprene) and mixtures of these elastomers. In such a case, component A may also comprise, in its entirety or in part, another highly unsaturated elastomer such as, for example, an SBR elastomer.

According to another advantageous embodiment of the invention, in particular, when it is intended for a tire sidewall, the composition according to the invention may contain at least one essentially saturated diene elastomer, in particular at least one EPDM copolymer, whether this copolymer be used or not used, for example, in a mixture with one or more of the highly unsaturated diene elastomers mentioned above.

The compositions of the present invention may contain a single diene elastomer or a mixture of several diene elastomers, the diene elastomer or elastomers possibly being used in association with any type of synthetic elastomer other than a diene elastomer, or even with polymers other than elastomers, for example thermoplastic polymers.

The white or inorganic filler used as the reinforcing filler may constitute all or only part of the total reinforcing filler, in this latter case associated, for example, with carbon black.

Preferably, in the rubber compositions according to the invention, the reinforcing inorganic filler constitutes the more than 50% by weight of the total reinforcing filler, more preferably, more than 80% by weight of the total reinforcing filler.

In the present application, "reinforcing inorganic filler", in known manner, is understood to mean an inorganic or mineral filler, whatever its color and its origin (natural or synthetic), which may also be referred to as a "white" filler or a "clear" filler (in contrast to carbon black). This inorganic filler is capable, on its own, without any other means than an intermediate coupling agent, of reinforcing a rubber composition intended for the manufacture of tires. Thus, the inorganic filler is capable of replacing a conventional tire-grade carbon black filler in its reinforcement function.

Preferably, the reinforcing inorganic filler is a mineral filler of the siliceous or aluminous type, or a mixture of these two types of fillers.

The silica ($SiO_2$) used may be any reinforcing silica known to the person skilled in the art, in particular, any precipitated or pyrogenic silica having a BET surface area and a specific CTAB surface area both of which are less than 450 $m^2/g$, preferably from 30 to 400 $m^2/g$. Highly dispersible precipitated silicas (referred to as "HDS") are preferred, in particular when the invention is used for the manufacture of tires having a low rolling resistance. "Highly dispersible silica" is understood in known manner to mean any silica having a substantial ability to disagglomerate and to disperse in an elastomeric matrix, which can be observed in known manner by electron or optical microscopy on thin sections. Non-limiting examples of such preferred highly dispersible silicas include the silicas BV3380 and Ultrasil 7000 from Degussa, the silicas Zeosil 1165 MP and 1115 MP from Rhodia, the silica Hi-Sil 2000 from PPG, the silicas Zeopol 8715 or 8745 from Huber, and treated precipitated silicas such as, for example, the aluminium-"doped" silicas described in application EP 0 735 088.

The reinforcing alumina ($Al_2O_3$) preferably used is a highly dispersible alumina having a BET surface area from 30 to 400 $m^2/g$, more preferably between 60 and 250 $m^2/g$, an average particle size of no more than 500 nm, more preferably of no more than 200 nm, as described in the aforementioned application EP 0 810 258. Non-limiting examples of such reinforcing aluminas include, in particular, the aluminas A125 or CR125 (from Baïkowski), APA- 100RDX (from Condea), Aluminoxid C (from Degussa) or AKP-G015 (Sumitomo Chemicals). The invention can also be implemented by using as reinforcing inorganic filler the specific aluminium (oxide-)hydroxides such as those described in application WO99/28376.

The physical state in which the reinforcing inorganic filler is present is immaterial, whether it be in the form of a powder, microbeads, granules or alternatively balls. "Reinforcing inorganic filler" is also understood to mean mixtures of different reinforcing inorganic fillers, in particular, of highly dispersible siliceous and/or aluminous fillers such as those described above.

When the rubber compositions of the invention are used as treads for tires, the reinforcing inorganic filler used, in particular if it is silica, preferably has a BET surface area of between 60 and 250 m²/g, more preferably between 80 and 230 m²/g.

The reinforcing inorganic filler may also be used in a blend or mixture with carbon black. Suitable carbon blacks include any carbon black, in particular the blacks of the type HAF, ISAF and SAF, which are conventionally used in tires, and particularly in treads for these tires. Non-limiting examples of such blacks include the blacks N115, N134, N234, N339, N347 and N375. The amount of carbon black present in the total reinforcing filler may vary within wide limits, where the amount preferably is less than the amount of reinforcing inorganic filler present in the rubber composition.

Preferably, the amount of total reinforcing filler (reinforcing inorganic filler plus carbon black, if applicable) lies in a range from 20 to 300 phr, more preferably from 30 to 150 phr, even more preferably from 50 to 130 phr (parts by weight to one hundred parts of elastomer), where the optimum amount differs according to the nature of the reinforcing inorganic filler used and the intended applications. For example, the level of reinforcement expected of a bicycle tire, is known to be distinctly lower than that required for a tire capable of travelling at a sustained high speed, for example a motorcycle tire, a passenger-vehicle tire or a tire for a utility vehicle such as a truck vehicle.

For treads for tires which are liable to travel at high speed, the quantity of reinforcing inorganic filler, in particular if it is silica, is preferably within a range from 50 to 100 phr.

In the present specification, the BET specific surface area is determined in known manner, in accordance with the method of Brunauer et al., *Journal of the American Chemical Society*, vol. 60, page 309 (February 1938), which corresponds to Standard AFNOR-NFT-45007 (November 1987). The CTAB specific surface area is the external surface area determined in accordance with the same Standard AFNOR-NFT-45007 of November 1987.

The coupling agent used in the rubber compositions according to the invention is a PSAS, which bears, in known manner, two types of functions referred to here as "Y" and "X", where the coupling agent can be grafted firstly on the inorganic filler by means of the "Y" function (alkoxysilyl function) and secondly on the elastomer by means of the "X" function (sulfur function).

PSAS are widely known to the person skilled in the art as coupling agents (inorganic filler/diene elastomer) in rubber compositions intended for the manufacture of tires. In particular, polysulfurized alkoxysilanes, which are referred to as "symmetrical" or "asymmetrical" depending on their specific structure, are used, such as those described in U.S. Pat. Nos. 3,842,111; 3,873,489; 3,978,103; 3,997,581; 4,002,594; 4,072,701; 4,129,585, or in the more recent patents or patent applications U.S. Pat. Nos. 5,580,919; 5,583,245; 5,650,457; 5,663,358; 5,663,395; 5,663,396; 5,674,932; 5,675,014; 5,684,171; 5,684,172; 5,696,197; 5,708,053; 5,892,085; and EP 1 043 357, which describe such known compounds in detail.

Particularly suitable for implementing the invention, without the definition below being limiting, are so-called "symmetrical" PSAS which satisfy the following general formula (I):

wherein:
n is an integer from 2 to 8 (preferably from 2 to 5); A is a divalent hydrocarbon radical; and Z corresponds to one of the formulae below:

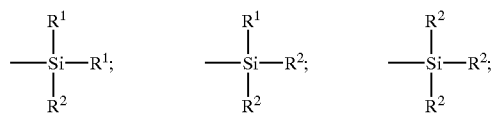

wherein:
the radicals $R^1$, which may or may not be substituted, and may be identical or different, represent a $C_1$–$C_{18}$ alkyl group, a $C_5$–$C_{18}$ cycloalkyl group, or a $C_6$–$C_{18}$ aryl group; and
the radicals $R^2$, which may or may not be substituted, and may be identical or different, represent a $C_1$–$C_{18}$ alkoxy group or a $C_5$–$C_{18}$ cycloalkoxyl group.

In the case of a mixture of PSAS in accordance with formula (I) above, in particular conventional, commercially available mixtures, it will be understood that the average value of n is a fractional number, preferably from 2 to 5.

The radical A, whether substituted or not, is preferably a divalent, saturated or non-saturated hydrocarbon radical, comprising 1 to 18 carbon atoms. In particular $C_1$–$C_{18}$ alkylene groups or $C_6$–$C_{12}$ arylene groups, more particularly $C_1$–$C_{10}$ alkylenes, notably $C_2$–$C_4$ alkylenes, in particular propylene, are suitable.

The radicals $R^1$ are preferably $C_1$–$C_6$ alkyl, cyclohexyl or phenyl groups, in particular $C_1$–$C_4$ alkyl groups, more particularly methyl and/or ethyl. The radicals $R^2$ are preferably $C_1$–$C_8$ alkoxy groups or $C_5$–$C_8$ cycloalkoxyl groups, more particularly methoxyl and/or ethoxyl.

Preferably, the PSAS used is a polysulfide, in particular a disulfide or a tetrasulfide, of bis-(($C_1$–$C_4$)alkoxysilyl ($C_1$–$C_{10}$)alkyl), more preferably still of bis(($C_1$–$C_4$) alkoxysilylpropyl), in particular of bis(tri-($C_1$–$C_4$) alkoxysilylpropyl), in particular of bis(3-triethoxysilylpropyl) or of bis(3-trimethoxysilylpropyl).

Bis(triethoxysilylpropyl)disulfide, or TESPD, of the formula $[(C_2H_5O)_3Si(CH_2)_3S]_2$, is sold, for example, by Degussa under the names Si266 or Si75 (in the latter case, in the form of a mixture of disulfide (75% by weight) and of polysulfide), or alternatively by Witco under the name Silquest A1589. Bis(triethoxysilylpropyl) tetrasulfide, or TESPT, of the formula $[(C_2H_5O)_3Si(CH_2)_3S_2]_2$, is sold, for example by Degussa under the name Si69 (or X50S when it is supported to 50% by weight on carbon black), or alternatively by Witco under the name Silquest A1289 (in both cases, a commercial mixture of polysulfides having an average value of n which is close to 4).

Very preferably, TESPT is used. However, one advantageous embodiment of the present invention consists in using TESPD which, although less active than TESPT when it is used on its own, has its effectiveness substantially improved by the presence of the aldimine and the guanidine derivative.

Another example of a PSAS organosilane may include, for example, an organosilane of the oligomeric or polymeric type, such as described, for example, in applications WO 96/10604 or DE 44 35 311 and corresponding to the formula below:

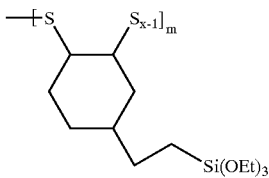

wherein x=1 to 8, m=1 to 200, and OEt represents the ethoxyl radical.

In the rubber compositions according to the invention, the content of PSAS is preferably between 0.5 and 15% by weight relative to the quantity of reinforcing inorganic filler, that is, in the majority of cases, between 1 and 10 phr, more preferably between 3 and 8 phr. However, it is generally desirable to use as little as possible of the PSAS. The presence of the aldimine and the guanidine derivative in these compositions advantageously makes it possible to be able to use the PSAS in a preferred amount of less than 10%, or even less than 8% by weight relative to the quantity of reinforcing inorganic filler; amounts of between 4 and 8% are thus advantageously possible.

The PSAS could be grafted beforehand (via the "X" function) on to the diene elastomer of the composition of the invention, where the elastomer is thus functionalized or "precoupled" comprises the free "Y" function for the reinforcing inorganic filler. The PSAS could also be grafted beforehand (via the "Y" function) onto the reinforcing inorganic filler, where the "precoupled" filler is then able to be bonded to the diene elastomer by means of the free "X" function.

However, it is preferred, in particular for reasons of better processing of the compositions in the uncured state, to use the coupling agent either grafted onto the reinforcing inorganic filler, or in the free (i.e., non-grafted) state, just like the aldimine and the guanidine derivative which are associated therewith in the coupling system according to the invention.

The coupling system according to the invention is formed of the PSAS coupling agent previously defined and a coupling activator for this alkoxysilane. Coupling "activator" is understood herein to mean a body (a compound or an association of compounds) which, when mixed with the coupling agent, increases the effectiveness of the coupling agent.

The coupling activator used according to the present invention is formed by the association of a free aldimine of formula (R—CH=N—R) and a guanidine derivative.

It will be recalled that imines, in known manner, can be obtained by reacting an aldehyde or a ketone on a primary amine, with elimination of water. The imines derived from aldehydes are called aldimines. The synthesis of aldimines has been described, for example, in *Advanced Organic Chemistry—Reactions, Mechanisms and Structure*, 4th edition, Jerry March, John Wiley and Sons, 1992, p. 896.

The aldimines used in the compositions of the invention correspond to the general formula R—CH=N—R (Formula II) in which the radicals R, which may be identical or different, represent a hydrocarbon group.

Preferably, in this formula (II), the radical R bonded to the carbon comprises 1 to 20 carbon atoms and the radical R bonded to the nitrogen comprises 1 to 30 carbon atoms. The radicals R may be straight-chain, cyclic or branched, and substituted or non-substituted, aliphatic or aromatic, and saturated or non-saturated. By way of example, the two radicals R could be joined to form a $C_3$–$C_8$ ring, in which ring a second heteroatom selected, for example, from among S, O and N, may possibly be present.

Examples of radicals R may include $C_1$–$C_{18}$ alkyls, $C_3$–$C_8$ cycloalkyls, $C_7$–$C_{20}$ arylalkyls, $C_6$–$C_{18}$ aryls, $C_7$–$C_{20}$ alkylaryls and $C_2$–$C_{18}$ alkenyls. More preferably, the radicals R are selected from among $C_1$–$C_{10}$ alkyls (in particular methyl, ethyl, propyl, butyl, pentyl, hexyl, octyl), $C_3$–$C_8$ cycloalkyls (in particular cyclopentyl, cyclohexyl, cycloheptyl), $C_7$–$C_{12}$ arylalkyls (in particular benzyl, phenyl-ethyl), $C_6$–$C_{12}$ (in particular phenyl, naphthyl), $C_7$–$C_{14}$ alkylaryls (in particular toluyl, xylyl, ethyl-phenyl) and $C_2$–$C_{10}$ alkenyls (in particular propenyl, butenyl).

Aldimines which can be used in the compositions of the invention include, in particular, the aldimines derived from aniline, in particular the aldimines of formulae (III-1) and (III-2) below, or those derived from cyclohexylamine, in particular the aldimines of formula (III-3) to (III-5) below.

The invention is preferably implemented with at least one aldimine selected from among the compounds having formula (III) below:

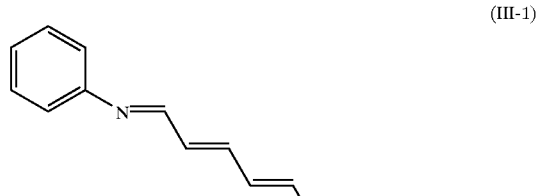

(III-1)

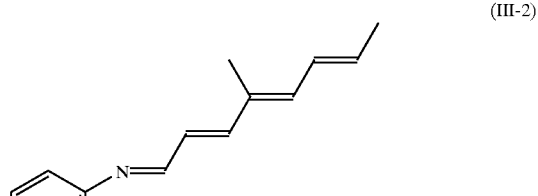

(III-2)

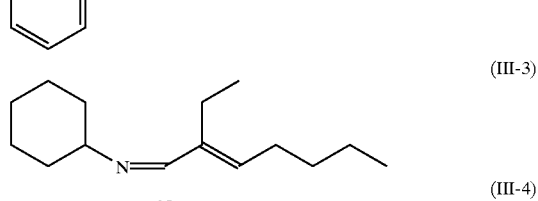

(III-3)

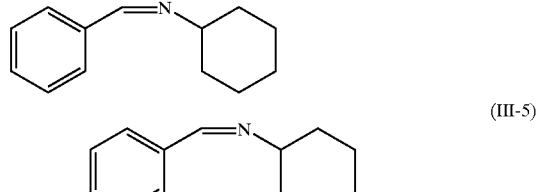

(III-4)

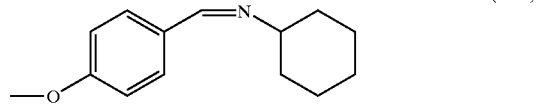

(III-5)

Preferably, at least one of the two radicals R of the aldimine is an aryl group, in particular a phenyl group. More preferably still, the aldimines are selected from among the aldimines derived from aniline, in particular the aldimines of formulae (III-1) and (III-2) above.

The person skilled in the art, having taken note of the invention, will be able to adjust the optimum content of aldimine according to the intended application, the inorganic filler used, and the nature of the elastomer used, within a range of preferably between 0.1 and 2 phr, more preferably between 0.2 and 1 phr. Amounts of between 0.2 and 0.6 phr are, for example, advantageously possible for the compositions intended for treads for tires for passenger vehicles.

The optimum content of aldimine will be selected, first and foremost, as a function of the quantity of PSAS used. Preferably, in the coupling system according to the invention, the quantity of aldimine represents between 1% and 20% by weight relative to the weight of PSAS. Below the minimum amounts indicated, the effect risks being inadequate, whereas beyond the maximum amounts indicated, generally no further improvement in the coupling is observed, whereas the costs of the composition increase, and there is the risk of scorching. For the reasons set forth above, the quantity of aldimine is more preferably between 3% and 12% relative to the weight of PSAS.

Preferably, in the rubber compositions according to the invention, the total quantity of PSAS and of aldimine represents less than 10%, more preferably between 5% and 10% by weight, relative to the quantity of reinforcing inorganic filler. In the majority of cases, this corresponds to an amount (PSAS+aldimine) of between 1 and 10 phr, more preferably between 4 and 8 phr.

The second component necessary for activation of the coupling is a guanidine derivative, that is to say a substituted guanidine. Substituted guanidines are well-known to the person skilled in the art, in particular as vulcanization agents, and have been described in numerous documents. (See, for example, *Vulcanization and Vulcanizing Agents* by W. Hofmann, Ed. MacLaren and Sons Ltd. (London), 1967; EP 0 683 203 or U.S. Pat. No. 5,569,721.)

In the compositions according to the invention, preferably N,N'-diphenylguanidine (abbreviated to "DPG") is used, which corresponds to the specific formula (IV-1) below:

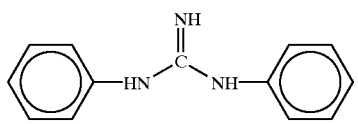

However, guanidine derivatives other than DPG may also be used, in particular, other aromatic guanidine derivatives corresponding to the general formula (IV) below:

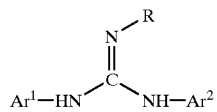

(IV)

wherein $Ar^1$ and $Ar^2$ represent a substituted or non-substituted aryl group, preferably a phenyl group, and R represents a hydrogen or a hydrocarbon group. Examples of compounds corresponding to the formula (IV) above include, in addition to DPG, which has already been mentioned, triphenylguanidine (TPG) or di-o-tolylguanidine (DOTG) having the formula (IV-2):

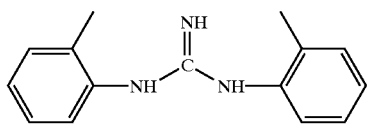

(IV-2)

In the compositions according to the invention, the quantity of guanidine derivative is preferably between 0.5% and 4% by weight, relative to the weight of reinforcing inorganic filler, more preferably between 1% and 3%, or preferably between 0.25 and 4 phr, more preferably still between 0.5 and 2 phr. Below the minimum amounts indicated, the effect of activation risks being inadequate, whereas beyond the maxima indicated, generally no further improvement in the coupling is observed, whereas there is a risk of premature vulcanization.

Preferably, in the compositions of the invention, the coupling system formed by the PSAS and the coupling activator (aldimine+guanidine derivative) represents a total of between 2% and 20%, more preferably between 5% and 15%, by weight, relative to the quantity of reinforcing inorganic filler. In the majority of cases, this coupling system shows sufficiently high performance, for the requirements of the compositions which are intended for the manufacture of tires, in particular those intended for tire treads for passenger vehicles, in an amount less than 12%, or even less than 10%, by weight relative to the quantity of reinforcing inorganic filler. Relative to the weight of diene elastomer, the amount of coupling system according to the invention is preferably between 2 and 15 phr, more preferably between 5 and 10 phr.

The rubber compositions according to the present invention also contain all or part of the additives usually used in sulfur-cross-linkable diene rubber compositions intended for the manufacture of tires, such as, for example, plasticizers, pigments, protective agents of the type antioxidants, antiozonants, a cross-linking system based either on sulfur or on sulfur donors and/or peroxide and/or bismaleimides, vulcanization accelerators, vulcanization activators, extender oils, etc. There may also be associated with the reinforcing inorganic filler, if necessary, a conventional non-reinforcing white filler, such as particles of clay, bentonite, talc, chalk, kaolin or titanium oxides.

The compositions according to the invention may also contain, in addition to the PSAS, covering agents (comprising, for example, the single Y function) for the reinforcing inorganic filler or more generally processing aids liable, in known manner, owing to an improvement in the dispersion of the inorganic filler in the rubber matrix and to a reduction in the viscosity of the compositions, to improve their ability to be worked in the uncured state. These agents may include, for example, alkylalkoxysilanes (in particular alkyltriethoxysilanes), polyols, polyethers (for example polyethylene glycols), primary, secondary or tertiary amines, hydroxylated or hydrolysable polyorganosiloxanes, for example α,ω-dihydroxy-polyorganosiloxanes (in particular α,ω-dihydroxy-polydimethylsiloxanes). These compositions could furthermore contain coupling agents other than PSAS.

The compositions are produced in suitable mixers, in a manner known to the person skilled in the art, typically using two successive preparation phases: a first phase of thermomechanical working at high temperature, followed by a second phase of mechanical working at lower temperature, as described, for example, in the patent applications EP 0 501 227, EP 0 810 258 or WO 99/28376, mentioned above.

The first phase of thermomechanical working (sometimes referred to as "non-productive" phase) is intended to mix thoroughly, by kneading, the various ingredients of the composition, with the exception of the vulcanization system. It is carried out in a suitable kneading device, such as an internal mixer or an extruder, until, under the action of the mechanical working and the high shearing imposed on the mixture, a maximum temperature generally between 120° C. and 190° C., preferably between 130° C. and 180° C., is reached.

This first phase may itself comprise a single or several thermomechanical working stages, separated for example by one or more intermediate cooling stages. The various ingredients of the composition, elastomer(s), reinforcing filler and its coupling system, and the various other components ("additives") may be incorporated in the mixer in one or more steps, either during the first thermomechanical stage, or staggered during the various thermomechanical stages, if applicable. The total duration of this thermomechanical working (typically between 1 and 20 minutes, for example between 2 and 10 minutes) is selected according to the specific operating conditions, in particular the maximum temperature selected, the nature and volume of the constituents, where it is important that a good dispersion of the various ingredients which interreact is obtained in the elastomeric matrix, thus permitting good processing of the composition in the uncured state and then a sufficient level of reinforcement, after curing, by the reinforcing filler and its intermediate coupling system.

After cooling of the mixture thus obtained, a second phase of mechanical working is then implemented at a lower temperature. Sometimes referred to as the "productive" phase, this finishing phase consists of incorporating by mixing the vulcanization (or cross-linking) system, in a suitable device, for example an open mill. It is performed for an appropriate time (typically between 1 and 30 minutes, for example between 2 and 5 minutes) and at a sufficiently low temperature (typically less than 120° C., for example between 60° C. and 100° C.), in all cases lower than the vulcanization temperature of the mixture, so as to protect against premature vulcanization or scorching.

According to a preferred embodiment of the process according to the present invention, all the base constituents of the compositions according to the invention, namely (ii) the reinforcing inorganic filler and the coupling system according to the invention which is formed by the association of (iii) the PSAS, (iv) the aldimine and (v) the guanidine derivative, are incorporated in (i) the diene elastomer during the first non-productive phase. Thus, at least these different base constituents are introduced into the mixer and are kneaded thermomechanically, in one or more stages, until a maximum temperature of between 120° C. and 190° C., preferably between 130° C. and 180° C., is reached.

By way of example, the first non-productive phase is carried out in two successive steps of a duration of 1 to 5 minutes, in a conventional internal blade mixer of the "Banbury" type, the initial tank temperature of which is about 60° C. First, the elastomer (or the elastomers) is introduced. Then, after, for example, 1 minute of kneading, the reinforcing filler and its associated coupling system is introduced. Kneading is continued and then, for example, 1 minute later, the various additives are added, including any possible complementary covering agents or processing agents, with the exception of the vulcanization system (sulfur and primary accelerator of the sulfenamide type). When the apparent density of the reinforcing filler (or of one of the reinforcing fillers, if several are used) is relatively low (as is the case, for example, of silicas), it may be preferable to divide the introduction of the latter, and, if applicable, that of its coupling system, into several steps in order to facilitate the incorporation thereof in the elastomeric matrix, for example half or even about ¾ of the filler after the first minute of kneading, and the rest after two minutes of kneading. The thermomechanical working is thus carried out until a maximum temperature, referred to as the "dropping" temperature, of, for example, between 150° C. and 170° C. is obtained. The block of mix thus obtained is recovered and is cooled to a temperature of less than 100° C. After cooling, a second thermomechanical stage is carried out in the same or a different mixer, with the aim of subjecting the mix to complementary heat treatment and obtaining in particular better dispersion of the reinforcing filler. Some of the additives, such as, for example, the stearic acid, the antiozone wax, the antioxidant, the zinc oxide or other additive, may not be introduced into the mixer, in their entirety or in part, until this second stage of thermomechanical working. The result of this first thermomechanical phase is then taken up on an external open mill, at low temperature (for example between 30° C. and 60° C.) and the vulcanization system is added; the entire composition is then mixed (productive phase) for several minutes, for example between 2 and 5 minutes.

The final composition thus obtained is then calendered, for example, in the form of a film or a sheet, in particular for characterization in the laboratory, or alternatively extruded, in order to form, for example, a rubber profiled element used for manufacturing semi-finished products such as treads, crown plies, sidewalls, carcass plies, beads, protectors, inner tubes or airtight internal rubbers for tubeless tires.

The vulcanization (or curing) is carried out in known manner at a temperature generally between 130° C. and 200° C., under pressure, for a sufficient time which may vary, for example, between 5 and 90 minutes, depending, in particular, on the curing temperature, the cross-linking system adopted and the vulcanization kinetics of the composition in question.

The present invention relates to the rubber compositions previously described, both in the "uncured" state (i.e., before curing) and in the "cured" or vulcanized state (i.e., after cross-linking or vulcanization).

The compositions according to the invention may be used alone or in a blend with any other rubber composition which can be used for manufacturing tires.

The present invention may be better understood through the Examples below. These Examples are intended to illustrate the invention and should not be construed as limiting the invention in any way.

EXAMPLES

Example 1

Synthesis of the Aldimines

The aldimines used in the following tests were synthesized in accordance with the operating methods described below:

Compound of Formula III-1: This aldimine is synthesized from aniline and 2,4-hexadienal as follows; 100 mL (milliliters) of toluene and 27.92 g (or 0.3 mol) of aniline are introduced into a three-necked flask surmounted by an Allihn condenser system and a Dean Stark-type apparatus for recovering the water formed. The reaction medium is then stirred and heated. When the reflux temperature of toluene is reached, 28.84 g (or 0.3 mol) of 2,4-hexadienal is added using a dropping funnel. After two hours, 5.1 mL of water have formed and the reaction is stopped. The solution is then concentrated on a rotary evaporator, without exceeding a temperature of 50° C. in order not to degrade the product obtained. The latter is a very viscous liquid, dark brown in color, the majority constituent of which is the expected compound of formula III-1, as demonstrated by ($^1$H and $^{13}$C) NMR analysis and mass spectrometry.

Compound of Formula III-2: 25 g of molecular sieve and 100 mL of toluene are introduced into a three-necked flask surmounted by an Allihn condenser. The mixture is stirred for several minutes and 9.3 g (0.12 mol) of aniline is added. Then, 9.25 g (0.11 mol) of trans-2-pentenal is added using a dropping funnel. The reaction medium is stirred at 25° C. for 16 hours. The solution is then filtered on a flit of porosity 4 and concentrated on a rotary evaporator. Finally, vacuum distillation makes it possible to eliminate the excess aniline. 8.5 g of an oily, orangey-yellow-colored product is recovered, the majority constituent of which is the expected compound of formula III-2 (as determined by NMR analysis and mass spectrometry).

Compound of Formula III-3: 100 mL of toluene and 29.75 g (0.3 mol) of cyclohexylamine are introduced into a three-necked flask surmounted by an Allihn condenser and a Dean Stark apparatus. The reaction medium is then stirred and heated. When the reflux temperature of toluene is reached, 25.84 g (or 0.3 mol) of valeraldehyde is added using a dropping funnel. After two hours, 5.1 mL of water has formed and the reaction is stopped. The solution is then concentrated on a rotary evaporator, without exceeding a temperature of 50° C. in order not to degrade the product. After distillation (elimination of the residual aniline), 2 g of an oily, orange-colored liquid are obtained, the main component of which is the expected compound of formula III-3 (as determined by NMR analysis and mass spectrometry).

Compounds of Formulae III-4 and III-5: These two known aldimines are synthesized from cyclohexylamine and an aromatic aldehyde (benzaldehyde for compound III-4 and p-anisaldehyde for compound III-5), as follows: 19.84 g (or 0.2 mol) of freshly distilled cyclohexylamine is diluted in 50 mL of toluene, in a 250 mL three-necked flask surmounted by the condenser system and the Dean Stark apparatus. By means of a dropping funnel, 21.22 g (or 0.2 mol) of benzaldehyde is introduced slowly (during about 2 hours) into this mixture, which is kept stirred. Once the addition has ended, the reaction medium is brought to the reflux temperature of toluene (approximately 110° C.), this stage making it possible to eliminate the water resulting from the condensation of the two reagents. When all the water expected is collected, the reaction medium is recovered and the solution is concentrated under vacuum (elimination of the toluene). An oily product (orangey-yellow color) corresponding to the aldimine III-4 is thus obtained. The same operation is effected with the para-anisaldehyde (0.2 mol, or 27.23 g) and results in the aldimine III-5. NMR analyses confirm the structure of the expected products.

The aldimines thus synthesized are used as such, without an additional purification stage.

Example 2

Preparation of the Rubber Compositions

For all the following tests, two thermomechanical stages are used which are separated by a cooling phase, in the following manner.

There are introduced into an internal laboratory mixer (0.4 liters), of the "Banbury" type, filled to 70% and the initial tank temperature of which is approximately 60° C., in succession the elastomer(s), approximately one minute later, ⅔ of the reinforcing inorganic filler and its associated coupling system, one minute later still, the rest of the reinforcing filler, its associated coupling system, and the various additives, with the exception of the antioxidant, the zinc oxide and the vulcanization system (sulfur and sulfenamide). A first thermomechanical working step is thus performed for about 3 to 4 minutes, until a maximum dropping temperature of about 165° is achieved. The elastomeric block is then recovered and cooled. Then a second stage is carried out in the same mixer with the same conditions: the elastomeric block is then subjected to a second thermomechanical working stage, also of 3 to 4 minutes duration, with addition of the zinc oxide and the antioxidant, until a maximum dropping temperature of approximately 165° C. is achieved.

The mixture thus obtained is recovered and is cooled and then sulfur and sulfenamide are added on an external mixer (homo-finisher) at 30° C., by mixing everything (productive phase) for 3 to 4 minutes.

The compositions thus obtained are then calendered either in the form of sheets (thickness of 2 to 3 mm) or of thin films of rubber in order to measure their physical or mechanical properties, or in the form of profiled elements which can be used directly, after cutting out and/or assembly to the dimensions desired, for example as semi-finished products for tires, in particular as treads. The vulcanization (curing) stage is carried out for 40 min at 150° C.

In the tests which follow, the reinforcing inorganic filler (silica and/or alumina) constitutes the entire reinforcing filler, used in a preferred amount within a range from 50 to 100 phr. However, a fraction of the reinforcing filler, preferably a minority fraction, could be replaced by carbon black.

Example 3

Characterization Tests

Test 1: In this first test, three rubber compositions (mixture of SBR and BR diene elastomers) reinforced with silica, which are intended for the manufacture of treads for tires are compared. The SBR elastomer is an SBR prepared in solution and comprises 26.5% styrene, 59.5% 1-2-polybutadiene units and 23% polybutadiene trans-1–4 units. The BR elastomer comprises 93% 1–4 cis units.

These three compositions are identical except that two of them (Compositions No. 2 and No. 3) furthermore comprise a very small quantity (0.5 phr, or 7.8% by weight relative to the quantity of PSAS) of aldimine (aldimine of formula III-2 for Composition No. 2 and aldimine of formula III-3 for Composition No. 3). The amount of PSAS (TESPT) in the three cases is equal to 6.4 phr (or 8% by weight relative to the quantity of silica). Each composition furthermore comprises 1.5 phr of DPG (or about 1.9% relative to the quantity of silica). The amount of coupling system according to the invention (TESPT+aldimine+DPG) advantageously represents, in Compositions No. 2 and No. 3, less than 12% (precisely, 10.5%) by weight relative to the quantity of reinforcing inorganic filler.

Tables 1 and 2 below show the formulation of the different compositions (Table 1-amount of the different products expressed in phr), and their properties before and after vulcanization.

TABLE 1

| Composition No: | 1 | 2 | 3 |
|---|---|---|---|
| SBR (1) | 88.5 | 88.5 | 88.5 |
| BR (2) | 25 | 25 | 25 |
| silica (3) | 80 | 80 | 80 |
| aromatic oil | 21.5 | 21.5 | 21.5 |
| TESPT (Si69) | 6.4 | 6.4 | 6.4 |
| aldimine (4) | — | 0.5 | — |

TABLE 1-continued

| Composition No: | 1 | 2 | 3 |
|---|---|---|---|
| aldimine (5) | — | — | 0.5 |
| DPG (6) | 1.5 | 1.5 | 1.5 |
| anti-ozone wax | 1.5 | 1.5 | 1.5 |
| stearic acid | 2 | 2 | 2 |
| antioxidant (7) | 1.9 | 1.9 | 1.9 |
| ZnO | 2.5 | 2.5 | 2.5 |
| sulfur | 1.1 | 1.1 | 1.1 |
| CBS (8) | 2 | 2 | 2 |

(1) solution SBR with 59.5% of 1,2-polybutadiene units; 26.5% of styrene; Tg = −29° C.; 75 phr SBR extended with 13.5 phr of aromatic oil (or a total of 88.5 phr);
(2) BR with 4.3% of 1-2; 2.7% of trans; 93% of cis 1–4 (Tg = −106° C.);
(3) silica type "HDS" - Zeosil 1165 MP from Rhodia in the form of microbeads (BET and CTAB: approximately 160 m²/g);
(4) compound of formula III-2:
(5) compound of formula III-3:
(6) N,N'-diphenylguanidine (Vulkacit D from Bayer);
(7) N-1,3-dimethylbutyl-N-phenyl-paraphenylenediamine; (Santoflex 6-PPD from Flexsys);
(8) N-cyclohexyl-2-benzothiazyl sulfenamide. (Santocure CBS from Flexsys).

TABLE 2

| Composition No: | 1 | 2 | 3 |
|---|---|---|---|
| Properties before curing: | | | |
| Mooney (MU) | 90 | 81 | 77 |
| T5 (min) | 17 | 9 | 16 |
| Properties after curing: | | | |
| M10 (MPa) | 5.15 | 5.18 | 5.04 |
| M100 (MPa) | 1.53 | 1.86 | 1.69 |
| M300 (MPa) | 1.88 | 2.65 | 2.21 |
| M300/M100 | 1.23 | 1.42 | 1.31 |
| HL (%) | 31 | 25 | 28 |
| Breaking stress (MPa) | 22.1 | 22.3 | 21.9 |
| Elongation at break (%) | 608 | 495 | 569 |

FIG. 1 shows the curves of modulus as a function of the elongation for these different compositions, these curves being marked C1, C2 and C3, and corresponding to Compositions No. 1, No. 2 and No. 3 respectively.

Examining the results of Table 2 shows that the compositions according to the invention (Compositions No. 2 and No. 3), compared with the control Composition No. 1, have in the uncured state a Mooney viscosity which is lower, hence substantially improved processing properties, scorching times which are shorter but which remain acceptable (in particular, a significant effect of acceleration of vulcanization on the part of the compound of formula III-2 is noted). In the cured state, the compositions of the invention (No. 2 and No. 3) have substantially improved properties:

- higher moduli at the high deformations (M100 and M300), and higher ratio M300/M100, which are indicators for the person skilled in the art of better reinforcement of the composition by the reinforcing inorganic filler;
- lower (and hence better) hysteresis losses (HL); and
- an identical breaking stress.

FIG. 1 confirms the above results: for elongations of 100% and more, all the values of modulus are greater in the case of Compositions No. 2 and No. 3. For such a range of elongations, this clearly illustrates better interaction between the reinforcing inorganic filler and the elastomer. There is noted in particular the excellent performance recorded with Composition No. 2 comprising the aldimine of formula III-2 (curve C2 located very much above the control curve C1).

In summary, all the results obtained after curing are representative of better coupling between the reinforcing inorganic filler and the diene elastomer, in other words activation, by the aldimine and the guanidine derivative in combination, of the coupling function of the PSAS.

Test 2: Three rubber compositions (SBR/BR mixture) which are identical apart from the following differences, are compared in this test:

Composition No. 4: TESPT (6.4 phr) with DPG (1.5 phr) but without aldimine;

Composition No. 5: TESPT (6.4 phr) activated by 1.5 phr DPG and 0.2 phr (or 3.1% by weight relative to the quantity of TESPT) of aldimine of formula III-1; and Composition No. 6: TESPT (6.4 phr) activated by 1.5 phr DPG and 0.4 phr (or 6.25% relative to the quantity of TESPT) of aldimine of formula III-1.

Only Compositions No. 5 and No. 6 are therefore in accordance with the invention; Composition No. 4 is the control for this test. Tables 3 and 4 show the formulation of the different compositions, and their properties before and after curing.

TABLE 3

| Composition No: | 4 | 5 | 6 |
|---|---|---|---|
| SBR (1) | 88.5 | 88.5 | 88.5 |
| BR (2) | 25 | 25 | 25 |
| silica (3) | 80 | 80 | 80 |
| aromatic oil | 21.5 | 21.5 | 21.5 |
| TESPT (Si69) | 6.4 | 6.4 | 6.4 |
| aldimine (9) | — | 0.2 | 0.4 |
| DPG (6) | 1.5 | 1.5 | 1.5 |
| anti-ozone wax | 1.5 | 1.5 | 1.5 |
| stearic acid | 2 | 2 | 2 |
| antioxidant (7) | 1.9 | 1.9 | 1.9 |
| ZnO | 2.5 | 2.5 | 2.5 |
| sulfur | 1.1 | 1.1 | 1.1 |
| CBS (8) | 2 | 2 | 2 |

(1) to (3); (6) to (8) See Table 1;
(9) compound of formula III-1.

TABLE 4

| Composition No: | 4 | 5 | 6 |
|---|---|---|---|
| Properties before curing: | | | |
| Mooney (MU) | 83 | 87 | 92 |
| T5 (min) | 20 | 14 | 10 |
| Properties after curing: | | | |
| M10 (MPa) | 5.34 | 5.15 | 4.90 |
| M100 (MPa) | 1.77 | 1.78 | 1.81 |
| M300 (MPa) | 2.17 | 2.26 | 2.42 |
| M300/M100 | 1.23 | 1.27 | 1.34 |
| HL (%) | 28 | 28 | 27 |
| Breaking stress (MPa) | 22 | 22 | 22.3 |
| Elongation at break (%) | 574 | 550 | 533 |

Figure 2:
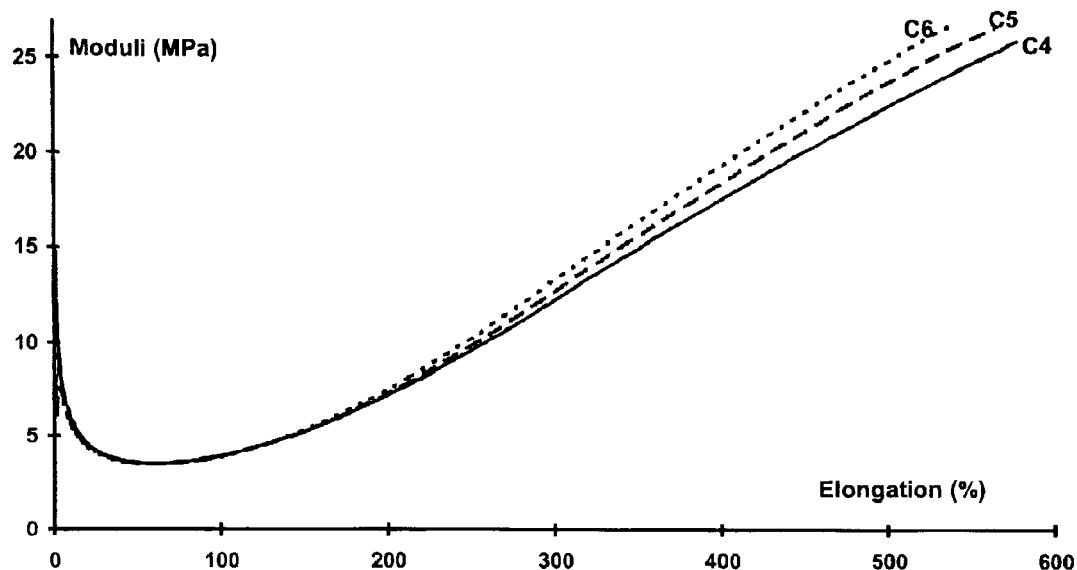
FIG. 2 shows curves of the variation of modulus (in MPa) as a function of elongation (in %) for rubber compositions C4, C5, and C6.

FIG. 2 shows the curves of modulus as a function of the elongation, these curves being marked C4 to C6, and corresponding to rubber Compositions No. 4 to No. 6, respectively. In Compositions No. 5 and No. 6 according to the invention, the total quantity (TESPT+aldimine) remains advantageously less than 10% (respectively 8.25% and 8.5%) by weight relative to the quantity of reinforcing inorganic filler. As for the coupling system of the invention (TESPT+aldimine+DPG), it represents in total less than 12% (respectively 10.1% and 10.4%) by weight relative to the quantity of reinforcing inorganic filler.

Examining the results of Table 4 shows that the compositions according to the invention (Compositions No. 5 and No. 6), compared with the control Composition No. 4, have in the uncured state a Mooney viscosity which is slightly greater, which can be attributed to a vulcanization-accelerating action on the part of the aldimine used (this effect being particularly notable in the case of Composition No. 6 comprising the highest amount of aldimine).

In the cured state, the properties of the compositions of the invention (No. 5 and No. 6) are improved: higher moduli M100 and M300 and ratio M300/M100 (indicators of better reinforcement), hysteresis losses (HL) slightly lower for Composition No. 6, the losses HL of Composition No. 5 being furthermore identical to those of the control. FIG. 2 confirms these results: for the highest elongations (beyond 200 or 300%), it will be noted that the values of modulus are greater in the case of Compositions No. 5 and No. 6, which illustrates slightly improved coupling between the reinforcing inorganic filler and the diene elastomer.

Test 3: The object of this test is to show that it is possible, because of the activation provided by the aldimine and the guanidine derivative, to reduce substantially the quantity of PSAS, without adversely affecting the properties of reinforcement of the compositions by the inorganic filler.

Three rubber compositions (SBR/BR mixture) which are identical, apart from the following differences, are compared here:

Composition No. 7: TESPT (6.4 phr) with DPG (1.5 phr) but without aldimine;

Composition No. 8: TESPT (5 phr) with DPG (1.5 phr) but without aldimine; and

Composition No. 9: TESPT (5 phr) activated by 1.5 phr DPG and 0.3 phr (or 6% by weight relative to the quantity of TESPT) of aldimine of formula III-1.

Only Composition No. 9 is therefore in accordance with the invention; Composition No. 7 is the reference composition of the prior art and Composition No. 8 represents a control having an identical amount of TESPT and DPG, compared with Composition No. 9. Tables 5 and 6 below show the formulation of the different compositions, and their properties before and after curing.

TABLE 5

| Composition No: | 7 | 8 | 9 |
|---|---|---|---|
| SBR (1) | 88.5 | 88.5 | 88.5 |
| BR (2) | 25 | 25 | 25 |
| silica (3) | 80 | 80 | 80 |
| aromatic oil | 21.5 | 21.5 | 21.5 |
| TESPT (Si69) | 6.4 | 5 | 5 |
| aldimine (9) | — | — | 0.3 |
| DPG (6) | 1.5 | 1.5 | 1.5 |
| anti-ozone wax | 1.5 | 1.5 | 1.5 |
| stearic acid | 2 | 2 | 2 |
| antioxidant (7) | 1.9 | 1.9 | 1.9 |
| ZnO | 2.5 | 2.5 | 2.5 |
| sulfur | 1.1 | 1.1 | 1.1 |
| CBS (8) | 2 | 2 | 2 |

(1) to (9) See Table 3.

TABLE 6

| Composition No: | 7 | 8 | 9 |
|---|---|---|---|
| Properties before curing: | | | |
| Mooney (MU) | 83 | 93 | 102 |
| T5 (min) | 20 | 18 | 11 |

TABLE 6-continued

| Composition No: | 7 | 8 | 9 |
|---|---|---|---|
| Properties after curing: | | | |
| M10 (MPa) | 5.54 | 5.12 | 4.79 |
| M100 (MPa) | 1.79 | 1.58 | 1.56 |
| M300 (MPa) | 2.31 | 1.83 | 2.02 |
| M300/M100 | 1.29 | 1.16 | 1.29 |
| HL (%) | 28 | 33 | 28 |
| Breaking stress (MPa) | 23 | 21.3 | 22.8 |
| Elongation at break (%) | 568 | 630 | 584 |

Figure 3:
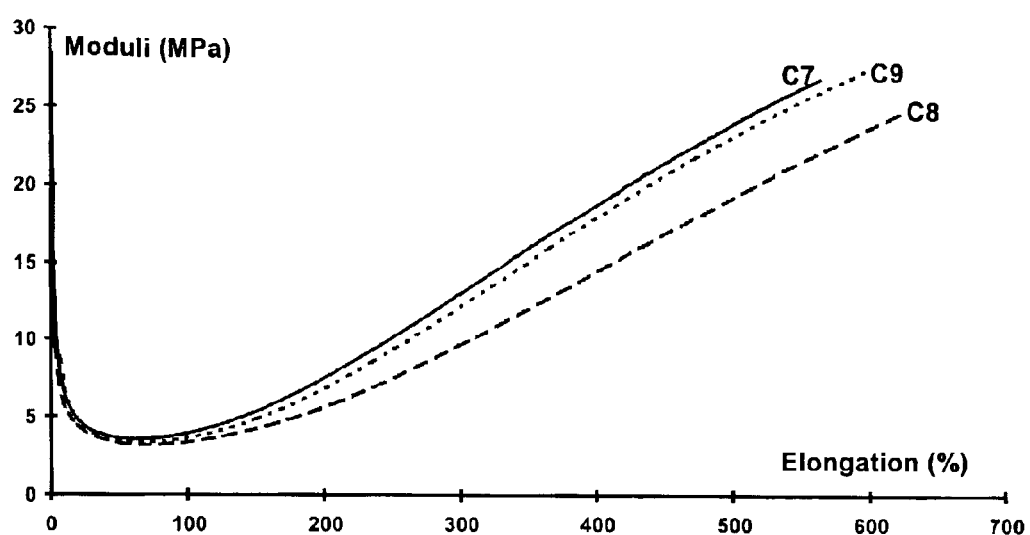
FIG. 3 shows curves of the variation of modulus (in MPa) as a function of elongation (in %) for rubber compositions C7, C8, and C9.

FIG. 3 shows the curves of modulus as a function of the elongation, these curves being marked C7 to C9, and corresponding to rubber Compositions No. 7 to No. 9 respectively.

It will be noted that in Composition No. 7 according to the prior art, the amount of TESPT represents 8% (by weight) relative to the quantity of silica. This amount, which is already advantageously low compared with the usual amounts used, is however greater by 30% than the amount of TESPT used in Composition No. 9 according to the invention.

In this composition according to the invention (No. 9), the quantity of TESPT advantageously represents less than 8% (precisely 6.25%) by weight relative to the quantity of silica. The total quantity (TESPT+aldimine) is itself less than 8% (precisely, 6.6%) by weight relative to the quantity of silica. As for the coupling system according to the invention (TESPT+aldimine+DPG), it represents in total, very advantageously, less than 10% (precisely, 8.5%) by weight relative to the quantity of reinforcing inorganic filler.

A study of the different results shows that Composition No. 9 according to the invention has a performance after curing which overall is superior to that of the control Composition No. 8 containing the same amount of TESPT, and substantially equivalent performance to that of the control Composition No. 7 despite an amount of TESPT which is significantly less in the composition of the invention. The results include the following:

modulus at the high deformations (M300) higher than that of Composition No. 8; ratio M300/M100 identical to that of Composition No. 7, greater than that of Composition No. 8;

hysteresis losses (HL) identical to those of Composition No. 7, and significantly lower (and hence better) than those of Composition No. 8; and properties at break equivalent to those of Composition No. 7.

FIG. 3 confirms the effect of activation of coupling provided by the aldimine and the guanidine derivative: it can clearly be seen that the values of modulus, for elongations of 100% and more, are substantially identical for Compositions No. 7 and No. 9 (curves C7 and C9 virtually overlapping), and located clearly above the curve C8 (Composition No. 8).

It is thus possible to reduce significantly (here, from 6.4 phr to 5 phr) the quantity of TESPT in the rubber compositions according to the invention, without adversely affecting the reinforcement properties.

Although the reduction in the amount of silane, as expected, involves an increase in the viscosity in the uncured state, the variations observed remain acceptable; in particular, the person skilled in the art will be able to correct, if necessary, the increase in viscosity in the uncured state by the addition of a small quantity of covering agent such as described previously. As for the reduction in the scorching time T5, which can be attributed to the presence of the aldimine, it also remains acceptable, with a safety margin which is still sufficient with respect to the problems of scorching.

Test 4: Three rubber compositions (SBR and BR mix) which are identical, apart from the following differences, are compared in this test:

Composition No. 10: TESPT (6.4 phr) with DPG (1.5 phr) but without aldimine;

Composition No. 11: TESPT (6.4 phr) activated by DPG (1.5 phr) and aldimine of formula III-3 (0.5 phr, or 7.8% by weight relative to the TESPT); and Composition No. 12: TESPT (6.4 phr) activated by DPG (1.5 phr) and aldimine of formula III-4 (0.6 phr or 9.4% by weight relative to the quantity of TESPT).

Only Compositions No. 11 and No. 12 are therefore in accordance with the invention; Composition No. 10 is the control for this test. Tables 7 and 8 below show the formulation of the different compositions, and their properties before and after curing.

TABLE 7

| Composition No.: | 10 | 11 | 12 |
|---|---|---|---|
| SBR (1) | 88.5 | 88.5 | 88.5 |
| BR (2) | 25 | 25 | 25 |
| silica (3) | 80 | 80 | 80 |
| aromatic oil | 21.5 | 21.5 | 21.5 |
| TESPT (Si69) | 6.4 | 6.4 | 6.4 |
| aldimine (10) | — | 0.5 | — |
| aldimine (11) | — | — | 0.6 |
| DPG (6) | 1.5 | 1.5 | 1.5 |
| anti-ozone wax | 1.5 | 1.5 | 1.5 |
| stearic acid | 2 | 2 | 2 |
| antioxidant (7) | 1.9 | 1.9 | 1.9 |
| ZnO | 2.5 | 2.5 | 2.5 |
| sulfur | 1.1 | 1.1 | 1.1 |
| CBS (8) | 2 | 2 | 2 |

(1) to (3) and (6) to (8) See Table 1;
(10) N-cyclohexyl benzaldimine (compound III-4);
(11) N-cyclohexyl o-methoxy benzaldimine (compound III-5).

TABLE 8

| Composition No.: | 10 | 11 | 12 |
|---|---|---|---|
| Properties before curing: | | | |
| Mooney (MU) | 86 | 85 | 86 |
| T5 (min) | 21 | 20 | 20 |
| Properties after curing: | | | |
| M10 (MPa) | 4.85 | 4.59 | 4.41 |
| M100 (MPa) | 1.59 | 1.61 | 1.52 |
| M300 (MPa) | 1.96 | 2.06 | 1.93 |
| M300/M100 | 1.23 | 1.28 | 1.27 |
| HL (%) | 29 | 27.5 | 28 |
| Breaking stress (MPa) | 22.8 | 22.9 | 22 |
| Elongation at break (%) | 625 | 592 | 597 |

Figure 4:
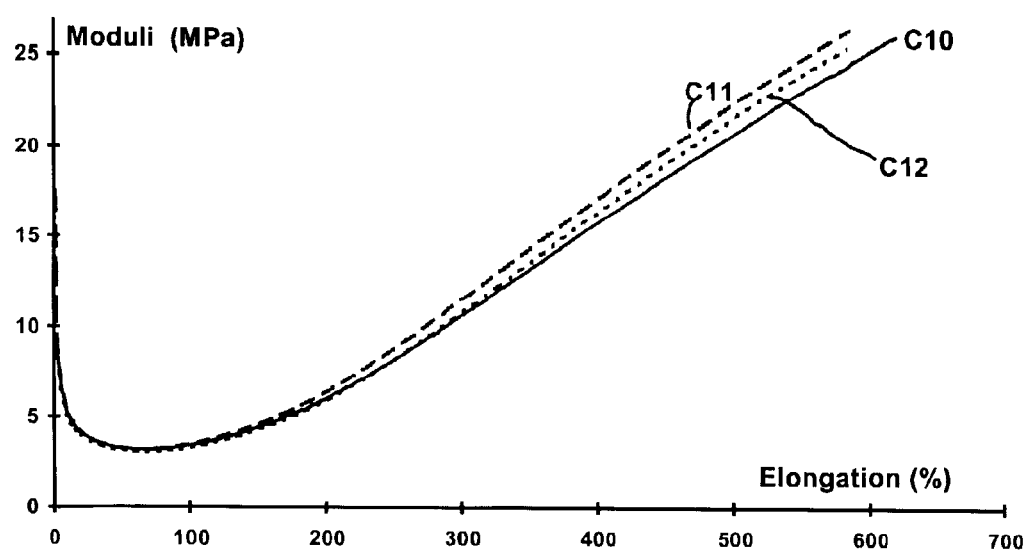
FIG. 4 shows curves of the variation of modulus (in MPa) as a function of elongation (in %) for rubber compositions C10, C11, and C12.

FIG. 4 shows the curves of modulus as a function of the elongation, these curves being marked C10 to C12, and corresponding to rubber Compositions No. 10 to No. 12, respectively. In Compositions No. 11 and No. 12 according to the invention, the total quantity (TESPT+aldimine) remains advantageously less than 10% (respectively 8.6% and 8.75%) by weight relative to the quantity of reinforcing inorganic filler. As for the coupling system of the invention (TESPT+aldimine+DPG), it represents in total less than 12% (respectively 10.5% and 10.6%) by weight relative to the quantity of reinforcing inorganic filler.

Examining the results of Table 8 shows that the compositions according to the invention, compared with the control Composition No. 10, have in the uncured state a Mooney viscosity and a time T5 which are identical, hence equivalent processing properties, and in the cured state improved properties: on one hand a higher ratio M300/M100, which indicates better reinforcement, and on the other hand hysteresis losses (HL) which are slightly lower, and therefore better. FIG. 4 confirms these results: for elongations of 300% and more, it can be seen that the values of modulus are always greater in the case of Compositions No. 11 and No. 12, which illustrates better interaction between the reinforcing inorganic filler and the elastomer.

Test 5: The invention here is implemented with a bis 3-triethoxysilylpropyl disulfide (abbreviated to TESPD) as PSAS coupling agent. Two rubber compositions similar to those of the tests above are compared, these two compositions being identical except for the following differences:

Composition No. 13: TESPD (5.6 phr); and

Composition No. 14: TESPD (5.6 phr) plus aldimine of formula III-1 (0.4 phr, or 7.1% by weight relative to the quantity of TESPD).

Each composition furthermore comprises 1.5 phr of guanidine derivative. Composition No. 13 is the control for this test (7% of TESPD relative to the weight of silica). In Composition No. 14 according to the invention, the amount of PSAS represents less than 8% (precisely, 7%) by weight relative to the quantity of silica (80 phr), just like the quantity (TESPD+aldimine) itself (precisely, 7.5%). As for the coupling system according to the invention (here, TESPD+aldimine+DPG), the amount thereof advantageously represents less than 10% (precisely, 9.4%) by weight relative to the quantity of reinforcing inorganic filler.

Tables 9 and 10 below show the formulation of the different compositions, and their properties before and after curing.

TABLE 9

| Composition No: | 13 | 14 |
|---|---|---|
| SBR (1) | 88.5 | 88.5 |
| BR (2) | 25 | 25 |
| silica (3) | 80 | 80 |
| aromatic oil | 21.5 | 21.5 |
| TESPD (Si266) | 5.6 | 5.6 |
| aldimine (9) | | 0.4 |
| DPG (6) | 1.5 | 1.5 |
| anti-ozone wax | 1.5 | 1.5 |
| stearic acid | 2 | 2 |
| antioxidant (7) | 1.9 | 1.9 |
| ZnO | 2.5 | 2.5 |
| sulfur | 1.1 | 1.1 |
| CBS (8) | 2 | 2 |

(1) to (9) See Table 3.

TABLE 10

| Composition No: | 13 | 14 |
|---|---|---|
| Properties before curing: | | |
| Mooney (MU) | 83 | 82 |
| T5 (min) | 28 | 15 |
| Properties after curing: | | |
| M10 (MPa) | 4.33 | 5.18 |
| M100 (MPa) | 1.30 | 1.30 |
| M300 (MPa) | 1.44 | 1.51 |
| M300/M100 | 1.11 | 1.15 |

TABLE 10-continued

| Composition No: | 13 | 14 |
|---|---|---|
| HL (%) | 35 | 34 |
| Breaking stress (MPa) | 22.4 | 22.5 |
| Elongation at break (%) | 718 | 683 |

Figure 5:
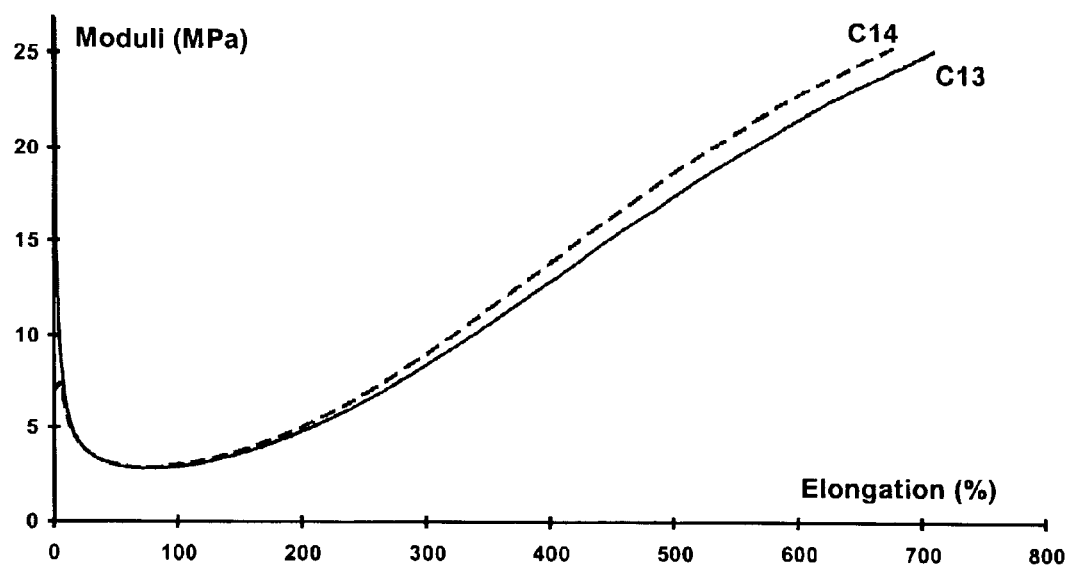
FIG. 5 shows curves of the variation of modulus (in MPa) as a function of elongation (in %) for rubber compositions C13 and C14.

FIG. 5 shows the curves of modulus as a function of the elongation, these curves being marked C13 and C14, and corresponding to Compositions No. 13 and No. 14, respectively. It will be noted that the addition of a small quantity of aldimine in Composition No. 14 results in an improvement in the reinforcement properties (higher values M300 and M300/M100). This effectiveness of the aldimine and the guanidine derivative combined, as coupling activator for the TESPD, is also clearly illustrated by the curve of FIG. 5 (curves C14 located, for elongations greater than 200%, beyond the curve C13).

Test 6: Two rubber compositions similar to those previously tested are prepared, the reinforcing filler here being constituted by a (50/50) mixture of reinforcing silica and alumina. The alumina is an alumina such as described in the aforementioned patent application EP 0 810 258.

These two compositions are identical except for the following differences:

Composition No. 15: TESPT (6.5 phr); and

Composition No. 16: TESPT (6.5 phr) with which is associated the aldimine of formula Ill-1 (0.5 phr, or 7.7% relative to the weight of TESPT).

Each composition furthermore comprises 0.9 phr of diphenylguanidine (or about 0.9% by weight relative to the quantity of reinforcing inorganic filler). Composition No. 15 is the control for this test, and contains an amount of PSAS of about 6.6% by weight relative to the quantity of reinforcing inorganic filler (6.5 phr of TESPT per 99 phr of reinforcing inorganic filler), but is devoid of aldimine. Composition No. 16, which is in accordance with the invention, comprises the coupling system according to the invention (TESPT+aldimine+DPG) in an amount advantageously less than 10% (precisely, 8.1%) by weight relative to the quantity of total reinforcing inorganic filler.

Tables 11 and 12 below show the formulation of the different compositions, and their properties before and after curing (40 min at 150° C.).

TABLE 11

| Composition No.: | 15 | 16 |
|---|---|---|
| SBR (1) | 88.5 | 88.5 |
| BR (2) | 25 | 25 |
| silica (3) | 49.5 | 49.5 |
| alumina (3a) | 49.5 | 49.5 |
| aromatic oil | 21.5 | 21.5 |
| TESPT (Si69) | 6.5 | 6.5 |
| aldimine (9) | — | 0.5 |
| ZnO | 2.5 | 2.5 |
| stearic acid | 2 | 2 |
| antioxidant (6) | 1.9 | 1.9 |
| DPG (7) | 0.9 | 0.9 |
| sulfur | 1.1 | 1.1 |
| CBS (8) | 2 | 2 |

(1) to (9) See Table 3;
(3a) alumina "CR125" from Baïkowski (in the form of powder - BET: approximately 105 m²/g).

TABLE 12

| Composition No. | 15 | 16 |
|---|---|---|
| Properties before curing: | | |
| Mooney (MU) | 93 | 102 |
| T5 (min) | 14 | 11 |
| Properties after curing: | | |
| M10 (MPa) | 5.18 | 5.05 |
| M100 (MPa) | 1.84 | 1.92 |
| M300 (MPa) | 2.17 | 2.41 |
| M300/M100 | 1.18 | 1.26 |
| HL (%) | 31 | 29 |
| Breaking stress (MPa) | 21.3 | 22.4 |
| Elongation at break (%) | 598 | 591 |

Figure 6:
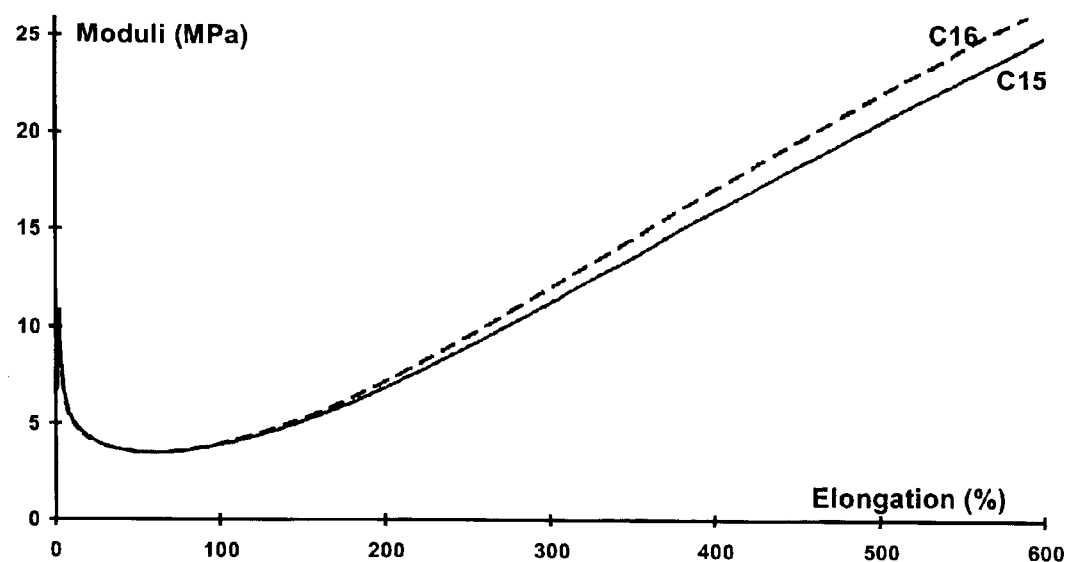
FIG. 6 shows curves of the variation of modulus (in MPa) as a function of elongation (in %) for rubber compositions C15 and C16.

FIG. 6 shows the curves of modulus as a function of the elongation, these curves being marked C15 and C16, and corresponding to Compositions No. 15 and No. 16, respectively.

Examination of the results of Table 12 shows properties which are comparable in the uncured state, and hence equivalent processing properties. In the cured state, again substantially improved properties are observed for the composition according to the invention: higher moduli M100 and M300, higher ratio M300/M100, slightly lower hysteresis losses (HL), higher breaking stress. The improved coupling between the diene elastomer and the reinforcing inorganic filler is also clearly illustrated by FIG. 6 (curve C16 above curve C15, for elongations of 200% and more).

Test 7: This test shows that the presence of a guanidine derivative is an essential characteristic in the coupling system according to the invention.

Three rubber compositions which are identical, apart from the following differences, are compared:

Composition No. 17: TESPT (6.4 phr) with DPG but without aldimine;

Composition No. 18: TESPT (6.4 phr) plus aldimine of formula III-1 (0.5 phr, or 7.8% by weight relative to the quantity of TESPT) with which there is associated DPG (1.5 phr); and Composition No. 19: TESPT (6.4 phr) with aldimine but without DPG.

Only Composition No. 18 is therefore in accordance with the invention; Composition No. 17 is the control for this test. Tables 13 and 14 below show the formulation of the different compositions, and their properties before and after curing.

TABLE 13

| Composition No.: | 17 | 18 | 19 |
|---|---|---|---|
| SBR (1) | 88.5 | 88.5 | 88.5 |
| BR (2) | 25 | 25 | 25 |
| silica (3) | 80 | 80 | 80 |
| aromatic oil | 21.5 | 21.5 | 21.5 |
| TESPT (Si69) | 6.4 | 6.4 | 6.4 |
| aldimine (9) | — | 0.5 | 0.5 |
| ZnO | 2.5 | 2.5 | 2.5 |
| stearic acid | 2 | 2 | 2 |
| antioxidant (6) | 1.9 | 1.9 | 1.9 |
| DPG (7) | 1.5 | 1.5 | — |
| sulfur | 1.1 | 1.1 | 1.1 |
| CBS (8) | 2 | 2 | 2 |

(1) to (9) See Table 3.

TABLE 14

| Composition No.: | 17 | 18 | 19 |
|---|---|---|---|
| Properties before curing: | | | |
| Mooney (MU) | 82 | 97 | >110 |
| T5 (min) | 16 | 11 | 14 |
| Properties after curing: | | | |
| M10 (MPa) | 5.04 | 4.83 | 4.68 |
| M100 (MPa) | 1.71 | 1.77 | 1.54 |
| M300 (MPa) | 2.24 | 2.49 | 1.74 |
| M300/M100 | 1.31 | 1.41 | 1.13 |
| HL (%) | 27 | 26 | 34 |
| Breaking stress (MPa) | 22.7 | 23.3 | 20.4 |
| Elongation at break (%) | 592 | 558 | 633 |

A study of the different results shows that Composition No. 18 according to the invention, compared with the control Composition No. 17, has in the uncured state a higher Mooney viscosity, a scorching time which is shorter but satisfactory, and improved properties in the cured state: significantly higher moduli M100 and M300, higher ratio M300/M100, slightly lower losses (HL). As for Composition No. 19, which is devoid of guanidine derivative, it will be noted that these properties are clearly degraded compared with the composition of the invention, both in the uncured state and after curing (higher Mooney viscosity, greater losses HL, lower level of reinforcement according to the values M100, M300 and ratio M300/M100). Clearly, in the absence of guanidine derivative, the aldimine has no effect on the PSAS coupling agent.

In conclusion, all of the preceding results represent improved coupling between the reinforcing inorganic filler and the diene elastomer when both an aldimine and a guanidine derivative are used, associated with the PSAS. In other words, these results represent activation, by the aldimine and the guanidine derivative in combination, of the coupling function fulfilled by the PSAS.

Because of this activation, it is henceforth possible to consider reducing the quantity of PSAS, in particular TESPT, while keeping the coupling properties and hence the wear properties at equivalent levels; thus, the overall cost of the rubber compositions can be reduced, as can that of the tires containing them.

A reduction in the amount of PSAS furthermore has the advantage, from the point of view of the environment (release of VOCs or "Volatile Organic Compounds"), of resulting in a reduction in the amounts of alcohol (ethanol in the case of TESPT) emitted during manufacture of the rubber compositions, or during the curing of the rubber articles incorporating these compositions.

The present invention also makes it possible, if a high amount of PSAS is maintained, to obtain a higher level of coupling, and therefore to obtain even better reinforcement of the rubber compositions by the reinforcing inorganic filler.

The present invention thus makes it possible to have treads for tires which have very good wear resistance combined with low rolling resistance, even in the presence of a reduced amount of PSAS (in particular TESPT).

The novel coupling system (inorganic filler/diene elastomer) according to the present invention thus offers the compositions of the invention a compromise of properties which is particularly advantageous compared with the compositions of the prior art reinforced with an inorganic filler.

What is claimed is:

1. A rubber composition useful for the manufacture of tires, based on a diene elastomer, a reinforcing inorganic filler, and a coupling system, said coupling system comprising a polysulfurized alkoxysilane coupling agent (inorganic filler/diene elastomer) associated with an aldimine having the general formula R—CH=N—R and a guanidine derivative.

2. The composition of claim 1, wherein the diene elastomer is selected from the group consisting of polybutadienes, polyisoprenes, natural rubber, butadiene copolymers, isoprene copolymers, and mixtures thereof.

3. The composition of claim 1, wherein the reinforcing inorganic filler is a siliceous filler or an aluminous filler.

4. The composition of claim 1, wherein the polysulfurized alkoxysilane is a bis-($C_1$–$C_4$)alkoxysilyl($C_1$–$C_{10}$)alkyl polysulfide.

5. The composition of claim 1, wherein at least one of the radicals R of the aldimine is an aryl group.

6. The composition of claim 1, wherein the aldimine is selected from the group consisting of aldimines derived from aniline and aldimines derived from cyclohexylamine.

7. The composition of claim 1, in which the quantity of aldimine represents between 1% and 20% relative to the weight of polysulfurized alkoxysilane.

8. The composition of claim 1, in which the total quantity of the polysulfurized alkoxysilane and the aldimine represents less than 10% relative to the weight of the reinforcing inorganic filler.

9. The composition of claim 1, wherein the guanidine derivative is N,N'-diphenylguanidine.

10. The composition of claim 1, in which the quantity of the guanidine derivative represents between 0.5 and 4% relative to the weight of the reinforcing inorganic filler.

11. The composition of claim 1, in which the total quantity of the coupling system comprising the polysulfurized alkoxysilane, the aldimine and the guanidine derivative represents between 2% and 20% relative to the weight of the reinforcing inorganic filler.

12. The composition of claim 2, wherein the diene elastomer is a butadiene-styrene copolymer (SBR) having a styrene content of between 20% and 30% by weight, a content of vinyl bonds of the butadiene part of between 15% and 65% by weight, a content of trans-1,4 bonds of between 20% and 75%, and a glass transition temperature of between −20° C. and −55° C.

13. The composition of claim 2, wherein the diene elastomer is a mixture of a butadiene-styrene copolymer (SBR) having a styrene content of between 20% and 30% by weight, a content of vinyl bonds of the butadiene part of between 15% and 65% by weight, a content of trans-1,4 bonds of between 20% and 75%, and a glass transition temperature of between −20° C. and −55° C.; and a polybutadiene having more than 90% cis-1,4 bonds.

14. The composition of claim 1 further comprising carbon black.

15. The composition of claim 4, wherein the polysulfurized alkoxysilane is a bis-($C_1$–$C_4$)alkoxy silylpropyl polysulfide.

16. The composition of claim 15, wherein the polysulfurized alkoxysilane is bis-3-triethoxysilylpropyl disulfide or bis-3-triethoxysilylpropyl tetrasulfide.

17. The composition of claim 6, wherein the aldimine is selected from the group consisting of compounds having the formulae (III-1) to (III-5):

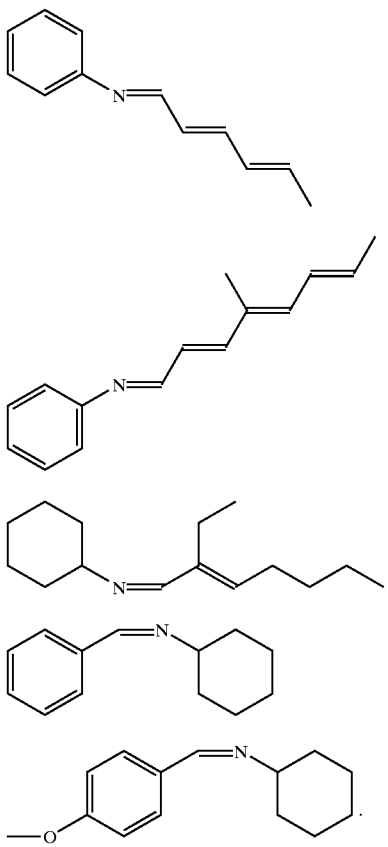

(III-1)

(III-2)

(III-3)

(III-4)

(III-5)

18. The rubber composition of claim 1, wherein the composition is in the vulcanized state.

19. A process for preparing a sulfur-vulcanizable rubber composition useful for the manufacture of tires comprising: incorporating by kneading into a diene elastomer, a reinforcing inorganic filler, and a coupling system, said coupling system comprising a polysulfurized alkoxysilane coupling agent (inorganic filler/diene elastomer) associated with an aldimine having the general formula R—CH=N—R and a guanidine derivative; and kneading the entire mixture thermomechanically, in one or more stages, until a maximum temperature of between 120° C. and 190° C. is reached.

20. The process of claim 19, wherein the diene elastomer is selected from the group consisting of polybutadienes, polyisoprenes, natural rubber, butadiene copolymers, isoprene copolymers, and mixtures thereof.

21. The process of claim 19, wherein the reinforcing inorganic filler is a siliceous filler or an aluminous filler.

22. The process of claim 19, wherein the polysulfurized alkoxysilane is a bis-$(C_1-C_4)$alkoxysilyl$(C_1-C_{10})$alkyl polysulfide.

23. The process of claim 19, wherein at least one of the radicals R of the aldimine is an aryl group.

24. The process of claim 19, wherein the aldimine is selected from the group consisting of aldimines derived from aniline and aldimines derived from cyclohexylamine.

25. The process of claim 19, in which the quantity of aldimine represents between 1% and 20% relative to the weight of polysulfurized alkoxysilane.

26. The process of claim 19, in which the total quantity of the polysulfurized alkoxysilane and the aldimine represents less than 10% relative to the weight of the reinforcing inorganic filler.

27. The process of claim 19, wherein the guanidine derivative is N,N'-diphenylguanidine.

28. The process of claim 19, in which the quantity of the guanidine derivative represents between 0.5 and 4% relative to the weight of the reinforcing inorganic filler.

29. The process of claim 19, in which the total quantity of the coupling system comprising the polysulfurized alkoxysilane, the aldimine and the guanidine derivative represents between 2% and 20% relative to the weight of the reinforcing inorganic filler.

30. The process of claim 22, wherein the polysulfurized alkoxysilane is a bis-$(C_1-C_4)$alkoxysilylpropyl polysulfide.

31. The process of claim 24, wherein the aldimine is selected from the group consisting of compounds having the formulae (III-1) to (III-5):

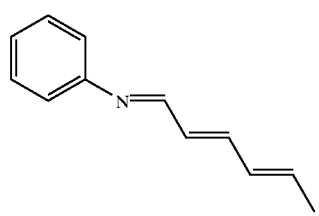

(III-1)

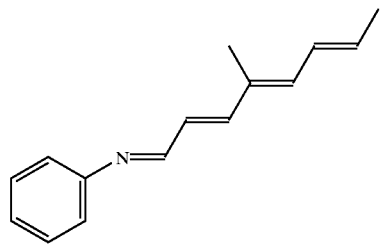

(III-2)

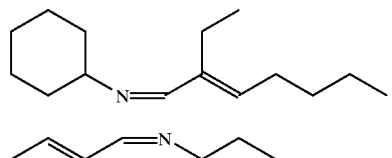

(III-3)

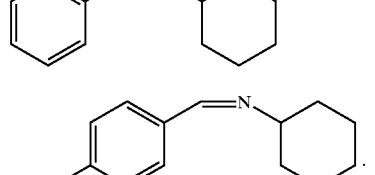

(III-4)

(III-5)

32. The process of claim 19, wherein the maximum kneading temperature is between 130° C. and 180° C.

33. A tire comprising a rubber composition, wherein the rubber composition is based on a diene elastomer, a reinforcing inorganic filler, and a coupling system, said coupling system comprising a polysulfurized alkoxysilane coupling agent (inorganic filler/diene elastomer) associated with an aldimine having the general formula R—CH=N—R and a guanidine derivative.

34. The tire of claim 33, wherein the diene elastomer is selected from the group consisting of polybutadienes, polyisoprenes, natural rubber, butadiene copolymers, isoprene copolymers, and mixtures thereof.

35. The tire of claim 33, wherein the reinforcing inorganic filler is a siliceous filler or an aluminous filler.

36. The tire of claim 33, wherein the polysulfurized alkoxysilane is a bis-$(C_1-C_4)$alkoxysilyl $(C_1-C_{10})$alkyl polysulfide.

37. The tire of claim 33, wherein at least one of the radicals R of the aldimine is an aryl group.

38. The tire of claim 33, wherein the aldimine is selected from the group consisting of aldimines derived from aniline and aldimines derived from cyclohexylamine.

39. The tire of claim 33, in which the quantity of aldimine represents between 1% and 20% relative to the weight of polysulfurized alkoxysilane.

40. The tire of claim 33, in which the total quantity of the polysulfurized alkoxysilane and the aldimine represents less than 10% relative to the weight of the reinforcing inorganic filler.

41. The tire of claim 33, wherein the guanidine derivative is N,N'-diphenylguanidine.

42. The tire of claim 33, in which the quantity of the guanidine derivative represents between 0.5 and 4% relative to the weight of the reinforcing inorganic filler.

43. The tire of claim 33, in which the total quantity of the coupling system comprising the polysulfurized alkoxysilane, the aldimine and the guanidine derivative represents between 2% and 20% relative to the weight of the reinforcing inorganic filler.

44. The tire of claim 33, wherein the diene elastomer is a butadiene-styrene copolymer (SBR) having a styrene content of between 20% and 30% by weight, a content of vinyl bonds of the butadiene part of between 15% and 65% by weight, a content of trans-1,4 bonds of between 20% and 75%, and a glass transition temperature of between −20° C. and −55° C.

45. The tire of claim 36, wherein the polysulfurized alkoxysilane is a bis-($C_1$–$C_4$)alkoxy silylpropyl polysulfide.

46. The tire of claim 45, wherein the polysulfurized alkoxysilane is bis-3-triethoxysilylpropyl disulfide or bis-3-triethoxysilylpropyl tetrasulfide.

47. The tire of claim 38, wherein the aldimine is selected from the group consisting of compounds having the formulae (III-1) to (III-5):

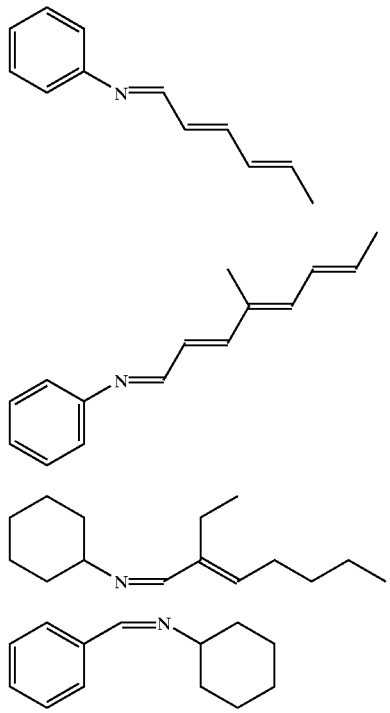

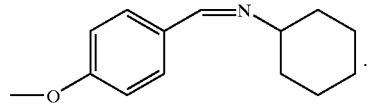

48. A tire tread comprising a rubber composition, wherein the rubber composition is based on a diene elastomer, a reinforcing inorganic filler, and a coupling system, said coupling system comprising a polysulfurized alkoxysilane coupling agent (inorganic filler/diene elastomer) associated with an aldimine having the general formula R—CH=N—R and a guanidine derivative.

49. The tread of claim 48, wherein the diene elastomer is selected from the group consisting of polybutadienes, polyisoprenes, natural rubber, butadiene copolymers, isoprene copolymers, and mixtures thereof.

50. The tread of claim 48, wherein the reinforcing inorganic filler is a siliceous filler or an aluminous filler.

51. The tread of claim 48, wherein the polysulfurized alkoxysilane is a bis-($C_1$–$C_4$)alkoxysilyl($C_1$–$C_{10}$)alkyl polysulfide.

52. The tread of claim 48, wherein at least one of the radicals R of the aldimine is an aryl group.

53. The tread of claim 48, wherein the aldimine is selected from the group consisting of aldimines derived from aniline and aldimines derived from cyclohexylamine.

54. The tread of claim 48, in which the quantity of aldimine represents between 1% and 20% relative to the weight of polysulfurized alkoxysilane.

55. The tread of claim 48, in which the total quantity of the polysulfurized alkoxysilane and the aldimine represents less than 10% relative to the weight of the reinforcing inorganic filler.

56. The tread of claim 48, wherein the guanidine derivative is N,N'-diphenylguanidine.

57. The tread of claim 48, in which the quantity of the guanidine derivative represents between 0.5 and 4% relative to the weight of the reinforcing inorganic filler.

58. The tread of claim 48, in which the total quantity of the coupling system comprising the polysulfurized alkoxysilane, the aldimine and the guanidine derivative represents between 2% and 20% relative to the weight of the reinforcing inorganic filler.

59. The tread of claim 49, wherein the diene elastomer is a butadiene-styrene copolymer (SBR) having a styrene content of between 20% and 30% by weight, a content of vinyl bonds of the butadiene part of between 15% and 65% by weight, a content of trans-1,4 bonds of between 20% and 75%, and a glass transition temperature of between −20° C. and −55° C.

60. The tread of claim 49, wherein the diene elastomer is a mixture of a butadiene-styrene copolymer (SBR) having a styrene content of between 20% and 30% by weight, a content of vinyl bonds of the butadiene part of between 15% and 65% by weight, a content of trans-1,4 bonds of between 20% and 75%, and a glass transition temperature of between −20° C. and −55° C.; and a polybutadiene having more than 90% cis-1,4 bonds.

61. The tread of claim 51, wherein the polysulfurized alkoxysilane is a bis-($C_1$–$C_4$)alkoxy silylpropyl polysulfide.

62. The tread of claim 61, wherein the polysulfurized alkoxysilane is bis-3-triethoxysilylpropyl disulfide or bis-3-triethoxysilylpropyl tetrasulfide.

63. The tread of claim 53, wherein the aldimine is selected from the group consisting of compounds having the formulae (III-1) to (III-5):

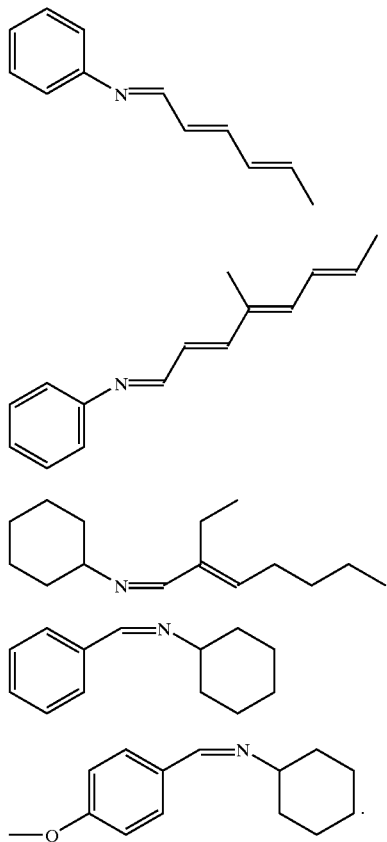

64. A coupling system (inorganic filler/diene elastomer) for a rubber composition based on a diene elastomer reinforced by a inorganic filler, useful for the manufacture of tires, the coupling system comprising a polysulfurized alkoxysilane coupling agent in association with an aldimine having the general formula R—CH=N—R and a guanadine derivative.

65. The coupling system of claim 64, wherein the polysulfurized alkoxysilane is a bis-$(C_1–C_4)$alkoxysilyl$(C_1–C_{10})$ alkyl polysulfide.

66. The coupling system of claim 64, wherein at least one of the radicals R of the aldimine is an aryl group.

67. The coupling system of claim 64, wherein the aldimine is selected from the group consisting of aldimines derived from aniline and aldimines derived from cyclohexylamine.

68. The coupling system of claim 67, wherein the aldimine is selected from the group consisting of compounds having the formulae (III-1) to (III-5):

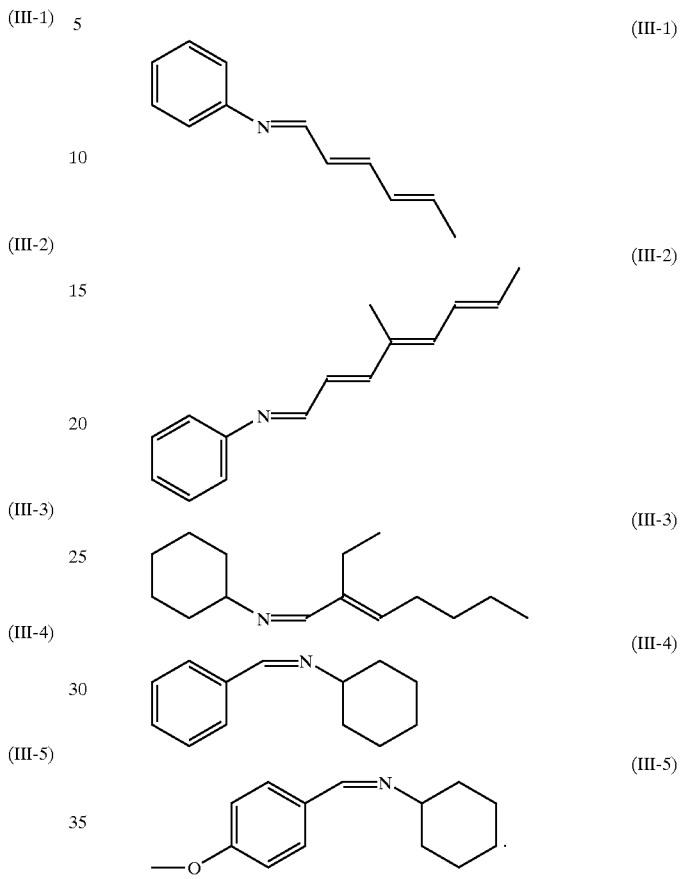

69. The coupling system of claim 64, wherein the guanidine derivative is N,N'-diphenylguanidine.

70. A semi-finished product for a tire, comprising a rubber composition, wherein the rubber composition is based on a diene elastomer, a reinforcing inorganic filler, and a coupling system, said coupling system comprising a polysulfurized alkoxysilane coupling agent (inorganic filler/diene elastomer) associated with an aldimine having the general formula R—CH=N—R and a guanidine derivative.

* * * * *